US005503933A

United States Patent [19]
Afeyan et al.

[11] Patent Number: 5,503,933
[45] Date of Patent: Apr. 2, 1996

[54] COVALENTLY BONDED COATINGS

[75] Inventors: Noubar B. Afeyan, Lexington, Mass.; Fred E. Regnier, West Lafayette, Ind.; Ning Mu, Arlington, Mass.

[73] Assignees: Purdue Research Foundation, W. Lafayette, Ind.; PerSeptive Biosystems, Inc., Framingham, Mass.

[21] Appl. No.: 201,906

[22] Filed: Feb. 25, 1994

[51] Int. Cl.$^6$ ...................................... B32B 5/16
[52] U.S. Cl. .................. 428/407; 210/198.2; 210/502.1; 427/221
[58] Field of Search ............................. 210/198.2, 502.1, 210/635, 638, 656; 427/220, 221; 428/406, 407; 530/413, 417

[56] References Cited

U.S. PATENT DOCUMENTS

| | | | |
|---|---|---|---|
| 4,186,120 | 1/1980 | Ugelstad | 260/29.6 RB |
| 4,332,694 | 6/1982 | Kálal et al. | 252/189 |
| 4,908,405 | 3/1990 | Bayer et al. | 525/61 |
| 4,923,901 | 5/1990 | Koester et al. | 521/53 |
| 4,931,498 | 6/1990 | Pidgeon | 210/656 X |
| 5,011,861 | 4/1991 | Coull et al. | 521/53 |
| 5,019,270 | 5/1991 | Afeyan et al. | 210/656 |
| 5,030,352 | 7/1991 | Varady et al. | 210/502.1 |
| 5,071,909 | 12/1991 | Pappin et al. | 525/54.1 |
| 5,276,062 | 1/1994 | Haase | 210/198.2 X |

FOREIGN PATENT DOCUMENTS 3500180  7/1986  Germany.

OTHER PUBLICATIONS

Afeyan et al., "Flow–Through Particles for the High–Performance Liquid Chromatographic Separation of Biomolecules: Perfusion Chromatography," *J. Chromatography*, 519:1–29 (1990).

Allcock and Lampe, "Contemporary Polymer Chemistry", 2nd Ed., Prentice–Hall, Inc. pp. i–xiii (1990).

Das, "Rapid Estimation of Ethylenes with Mercuric Acetate," *Anal. Chem.*, 26:1086–1087 (1954).

Dawkins et al., "Chromatographic Characteristics of Polymer–Based High Performance Liquid Chromatography Packings," *J. Chromatogr.*, 352:157–167 (1986).

Engelhardt et al., "Polymer Encapsulated Stationary Phases: Advantages, Properties and Selectivities," *Chromatographia*, 27:535–543 (1989).

Frechet et al., in "Future Trends in Polymer Science and Technology," E. Martuscelli, Ed., Technomic Publishing Co., Inc., Basel (1987), pp. 118–133.

Frechet et al., "Reactive Polymers: Design Considerations, Novel Preparations and Selected Applications in Organic Chemistry," *Pure & Appl. Chem.*, 60:353–364 (1988).

Kun et al., "The Pore Structure of Macroreticular Ion Exchange Resins," *J. Polymer Sci.*, 16:1457–1469 (1967).

Kun et al., "Macroreticular Resins. III. Formation of Macroreticular Styrene–Divinylbenzene Copolymers," *J. Polymer Sci.*, 6:2689–2701 (1968).

(List continued on next page.)

Primary Examiner—Michael Lusignan
Attorney, Agent, or Firm—Testa, Hurwitz & Thibeault

[57] ABSTRACT

Disclosed are hydrophilic coatings covalently bound to hydrophobic surfaces as well as methods for their production. To form the coated surfaces, a compound is provided which comprises a hydrophobic domain including an unsaturated group and a hydrophilic domain. Also provided is a hydrophobic surface comprising unsaturated groups. Molecules of the compound are adsorbed onto the hydrophobic surface, and the unsaturated groups in the hydrophobic domains of molecules of the compound then are covalently crosslinked to the unsaturated groups on the hydrophobic surface by a free radical reaction. In one embodiment, hydrophilic coatings may be covalently attached to hydrophobic polymers such as divinylbenzene crosslinked polystyrene. Hydrophilic coatings covalently attached to hydrophobic surfaces are obtained which are stable, which may be readily derivatized, and which are useful in a wide range of chromatography applications.

31 Claims, 15 Drawing Sheets

OTHER PUBLICATIONS

Malinksy et al., "Vinyl–Divinyl Copolymerization: Copolymerization and Network Formation from Styrene and p– and m–Divinylbenzene," *J. Macromol. Sci. Chem.*, A5:1071–1085 (1971).

Marshall, "Simplified Reverse–Phase Separation of Basic Compounds," *American Laboratory*, Sep., pp. 36E–36 M (1991).

Rounds et al., "Poly(Styrene–Divinylbenzene)–Based Strong Anion–Exchange Packing Material for High–Performance Liquid Chromatography of Proteins," *J. Chromatogr.*, 397:25–38 (1987).

Snyder and Soto, "The Reaction of Primary and Secondary Alkylaryl and Alkyl Sulfonates with Potassium t–Butoxide in Dimethyl Sulfoxide," *J. Org. Chem.*, 29:742–745 (1964).

Varady et al., "Fimbriated Stationary Phases for Proteins," *J. Chromatogr.*, 631:107–114 (1993).

Vancek and Regnier, "Variable in the High Performance Anion–Exchange Chomatography of Proteins" *Biochemistry*, 109:345 (1980).

Yang et al., "Reversed–Phase and Cation–Exchange Chromatography on a New Poly(styrene–divinylbenzene) High Capacity, Weak Cation–Exchanger," *Chromatographia*, 20:735–738 (1985).

Yang and Regnier, "Coated Hydrophilic Polystyrene–Based Packing Materials," *J. Chromatogr.*, 544:233–247 (1991).

Yang and Verzele, "New Water–Compatible Modified Polystrene as a Stationary Phase for High–Performance Liquid Chromatrography," *J. Chromatogr.*, 387:197–205 (1987).

Yang and Verzele, "High–Speed and High–Performance Size–Exclusion Chromatography of Proteins on a New Hydrophilic Polystyrene–Based Resin," *J. Chromatogr.*, 391:383–393 (1987).

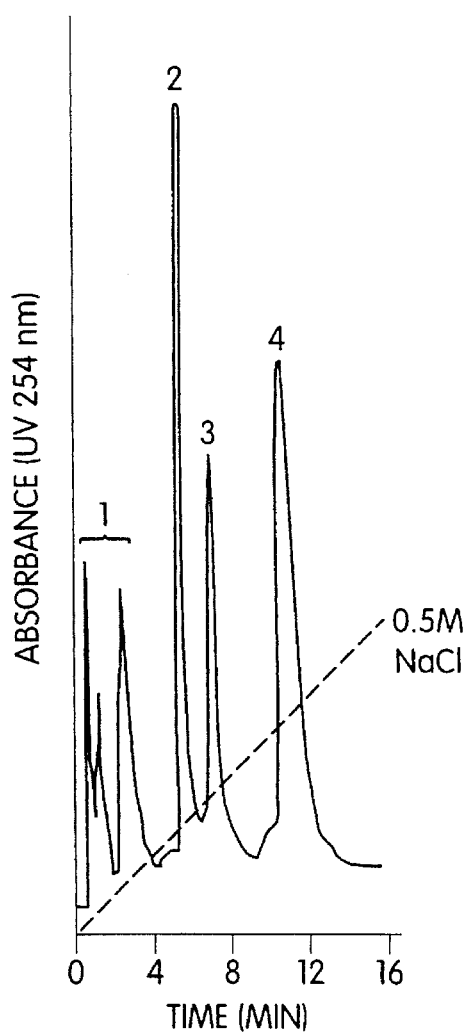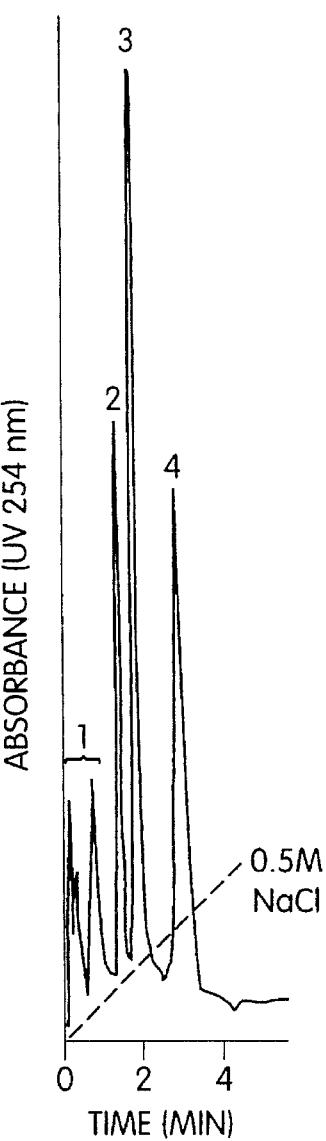
1 = MYOGLOBIN
2 = RIBONUCLEASE A
3 = CYTOCHROME C
4 = LYSOZYME
Fig. 15a
Fig. 15b

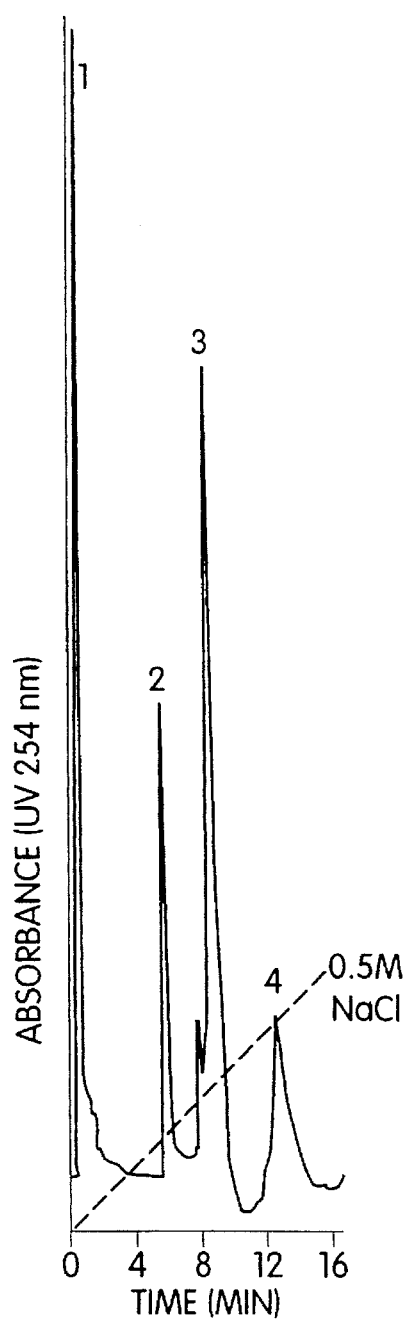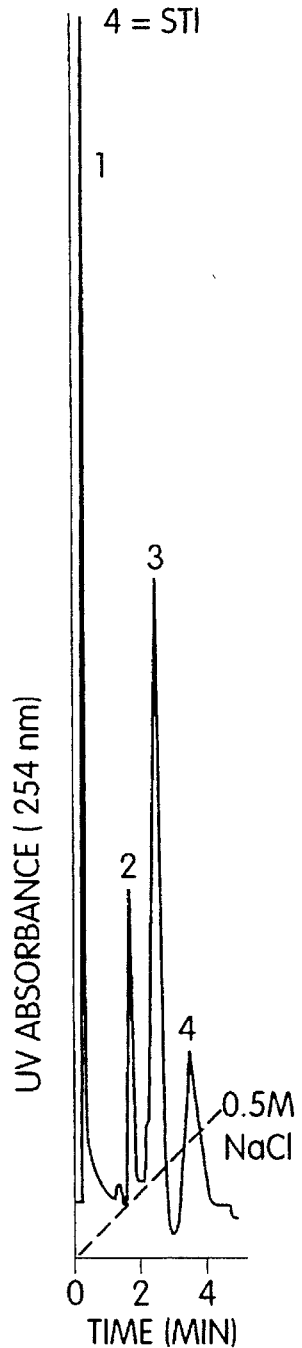
Fig. 16a
Fig. 16b

COVALENTLY BONDED COATINGS

BACKGROUND OF THE INVENTION

This invention relates generally to methods for fabricating covalently bonded hydrophilic coatings on hydrophobic surfaces.

Polystyrene divinylbenzene (PS-DVB) based chromatography materials, such as POROS (Registered) materials, manufactured by PerSeptive Biosystems (Cambridge, Mass.), have been demonstrated to be useful in the separation of macromolecules. U.S. Pat. No. 5,019,270 (1991). However, the inherent hydrophobic character of hydrocarbon-based chromatographic supports, such as PS-DVB, is a serious impediment to their use in protein separations. Boardman and Patridge, *Biochem J.*, 59:543 (1955). Hydrophobic interactions between the support and proteins are sufficiently strong that proteins may be denatured either upon adsorption or during elution. Additionally, PS-DVB chromatography supports are difficult to derivatize, since they have no active functional groups for direct derivatization. Frechet et al., "Future Trends in Polymer Science and Technology", E Martuscelli, Ed., Technomic Publishing Co., Inc., Basel, 1987.

The aromatic rings of the monomers have been derivatized, before polymerization, to produce a variety of functionalized PS-DVB packing materials, which were not useful in protein separations. Frechet et al., *Pure & Appl. Chemo*, 60:353 (1988). Functional groups attached to the aromatic rings cannot mask the surface of PS-DVB, and the hydrophobic residues of proteins still can interact with the hydrophobic surface. PS-DVB beads have been modified by attaching hydrophilic functionalities on both the aromatic ring and the polymer backbones. Yang et al., *Chromatographia*, 20:735 (1985); Yang and Verzele, *J. Chromatogr.*, 387:197 (1987); and Yang and Verzele, *J. Chromatogr.*, 391:383 (1987). Using these modified PS-DVB materials, however, organic solvents had to be added to the mobile phase during chromatography because of hydrophobic interactions.

Sulfonation of PS-DVB, followed by coating with polyethyleneimine, after crosslinking and quaternization, produced a strong anion-exchange packing material. Rounds et al., *J. Chromatogr.*, 397:25 (1987). The disadvantage of this coating is that the polyamine polymer could only be used to make anion-exchangers. It was impossible to prepare a broad spectrum of PS-DVB based packings using this coating.

Pharmacia (Uppsala, Sweden) has prepared functionalized PS-DVB based packings for protein separation under the trade name MONOBEADS by proprietary procedures. A grafted copolymer of polyoxyethylene and crosslinked polymers was constructed as a support to bind proteins in some applications, but very few chromatographic properties have been reported. E. Bayer, German Pat. No. DE 3,500,180 (1986); and U.S. Pat. No. 4,908,405 (1990).

Molecules of a solute comprising hydrophilic and hydrophobic domains were adsorbed onto a hydrophobic polymeric support, such as PS-DVB, and crosslinked to produce a hydrophilic coating on the support. U.S. Pat. No. 5,030,352 (1991). The crosslinking and polymerization of epichlorohydrin and glycidol was reported. Additionally, the formation of a crosslinked coating of glycidyl methacrylate adsorbed onto PS-DVB followed by derivatization of the coating with methacrylic acid in the presence of ammonium persulfate and tetramethylethylene diamine was reported. The reference discloses that the molecules of the coating are chemically crosslinked among each other to form a continuous layer, and the crosslinked layer is adsorbed to the PS-DVB surface by hydrophobic-hydrophobic interaction. The reference failed to suggest that covalent bonds were formed between the coating and PS-DVB.

It is an object of the invention to provide methods for forming covalent bonds between hydrophilic coatings and the surface of hydrophobic materials, such as PS-DVB. It is another object of the invention to provide covalent hydrophilic coatings on hydrophobic surfaces, such as PS-DVB polymers, which are sufficiently hydrophilic to mask the hydrophobic surfaces, and which permit the polymer to be used in protein separation without causing protein denaturation. It is a further object of the invention to provide covalent coatings which may be derivatized readily to produce a wide range of different functional groups for use in different chromatography applications.

SUMMARY OF THE INVENTION

The invention provides methods for the production of hydrophilic coatings that are covalently bound to hydrophobic surfaces, as well as materials made according to the method. According to the methods of the invention, covalent hydrophilic coatings may be attached to the hydrophobic surface of polymers, such as PS-DVB, to enable the polymers to be utilized in a wide range of chromatography applications.

In one embodiment, a high surface area polymer is provided having a hydrophobic surface comprising unsaturated groups. A first compound, free of poly(glycidyl methacrylate), or free of methacrylic acid, also is provided, comprising a hydrophobic domain covalently and flexibly bonded to a hydrophilic domain, wherein the hydrophobic domain comprises an unsaturated group. Alternatively, the first compound is provided free of methacrylic acid. The hydrophobic surface is contacted with a liquid phase, hydrophilic with respect to the surface, containing solvated molecules of the first compound. The molecules of the compound are deposited on the hydrophobic surface, oriented with the hydrophobic domains proximate to and adsorbed on the surface, and with the hydrophilic domains extending outwardly from the surface into the liquid phase. The unsaturated groups on the hydrophobic domain of molecules of the first compound then are covalently crosslinked to the unsaturated groups on the hydrophobic surface to produce a hydrophilic coating covalently bound to the surface of the polymer, preferably by a free radical reaction.

The hydrophilic coated polymer may define, e.g., a chromatography matrix. In one embodiment, the hydrophobic surface may comprise a divinylbenzene crosslinked polystyrene (PS-DVB) polymer. Highly crosslinked PS-DVB packing materials have double bonds left unreacted on their surface. Malinsky et al., *J. Macromol. Sci. Chem.*, A5:1071 (1971). PS-DVB polymers useful in the methods of the invention preferably include unsaturated groups on the surface of the polymer which titrate to at least about 0.23 mmol/g. Upon formation of the covalent coating on the PS-DVB polymer, active vinyl groups on the PS-DVB polymer which could undergo undesirable addition reactions in some chromatographic applications, are eliminated.

The hydrophilic coating covalently bound to the hydrophobic surface is constructed with sufficient hydrophilic groups to mask the hydrophobic domains and the hydrophobic surface. Covalent hydrophilic coatings may be constructed which are stable in a wide pH range, e.g., pH 2–12, and which make the hydrophobic surface sufficiently hydrophilic to be used for protein separations. The covalent hydrophilic coatings have a fimbriate structure, comprising covalent hydrophilic polymer chains, which shield the hydrophobic surface of the polymer from contact with proteins and increase loading capacity by increasing the available surface area.

The first compound comprises both a hydrophilic and a hydrophobic domain. The hydrophobic domain, comprising an unsaturated group, adsorbs to the hydrophobic surface, which facilitates crosslinking of the unsaturated group on the first compound with the unsaturated group on the hydrophobic surface. The first compound may comprise plural hydrophilic domains and plural hydrophobic domains. The hydrophilic domains shield the hydrophobic surface and the hydrophobic domains and provide functionalities that can be derivatized to prepare stationary phases for different chromatography applications.

Optionally, the first compound may be derivatized to produce a hydrophilic moiety, such as a hydroxyl, aldehyde, carboxylic acid, sulfonic acid or quaternary amine, to increase the hydrophilicity of the coating. To facilitate derivatization of the coating, the first compound may include a reactive group, such as a hydroxyl, which may be covalently reacted with a second compound comprising a hydrophilic moiety. In one embodiment, the first compound may comprise modified polyvinylalcohol (PVA), formed by tosylation of a portion of the alcohol groups on PVA, followed by elimination to form double bonds. Modified (PVA) is useful since it has no unstable bonds, is very hydrophilic and biocompatible, comprises unsaturated groups and has hydroxyl groups which are easy to derivatize.

In one embodiment, a hydroxyl on the first compound, such as modified PVA, may be derivatized with glycidol. Plural molecules of glycidol may be polymerically attached to the hydroxyl on the first compound of the coating by the addition of boron trifluoride etherate, to produce a covalent coating comprising polymer chains including plural hydroxyls. The hydroxyls of the covalently bound coating also may be oxidized to produce plural carboxylic acid groups. In another embodiment, the hydroxyl on the first compound on the coating may be reacted with a second compound, e.g., an epihalohydrin such as epibromohydrin, to produce a terminal halide on the covalent coating, which may be reacted with an amine to produce a quaternary amine.

In another embodiment, the first compound may comprise poly(glycidyl methacrylate), free of methacrylic acid. In this embodiment, the unsaturated groups on the poly(glycidyl methacrylate) are reacted with the unsaturated groups on the hydrophobic surface of the polymer to produce a covalent hydrophilic coating on the polymer. The poly(glycidyl methacrylate) coating may be derivatized to produce a hydrophilic moiety, such as a carboxylic acid, sulfonic acid or quaternary amine, e.g., by reaction of the unsaturated groups on the poly(glycidyl methacrylate) coating with an unsaturated group on a second compound comprising a hydrophilic moiety. For example, unsaturated groups on the poly(glycidyl methacrylate) coating can be reacted with an unsaturated group on a second compound, such as acrylic acid, 2-acrylamido- 2-methyl-1-propanesulfonic acid, [3-(methacryloylamino) propyl] trimethylammonium chloride, 2-acrylamido-glycolic acid, itaconic acid or ethyl vinyl ketone. The reaction of an unsaturated group on poly(glycidyl methacrylate) to unsaturated groups on the polymer and to an unsaturated group on the second compound, may be conducted simultaneously in one step, by a free radical reaction. Covalent poly(glycidyl methacrylate) coatings on the surface of PS-DVB thus may be readily synthesized and derivatized.

The method of the invention thus may be utilized to construct covalent hydrophilic coatings on the surface of hydrophobic PS-DVB polymers, and to overcome the difficulty of forming covalent bonds between coatings and the PS-DVB surfaces. The methods and compositions of the invention provide a hydrophilic coated polymer that is chemically stable at high and low extremes in pH. Coated polymers are produced which readily derivatizable, and which maybe utilized in a wide range of chromatography applications for the separation of biological and other molecules.

BRIEF DESCRIPTION OF THE DRAWINGS

FIG. 15A is a chromatogram of absorbance versus time in a protein separation test on a weak cation exchanger at a flow rate of 1 ml/min.

FIG. 15B is a chromatogram of absorbance versus time in a protein separation test on a weak cation exchanger at a flow rate of 4 ml/min.

FIG. 16A is a chromatogram of absorbance versus time in a protein separation test using a strong anion exchanger at a flow rate of 1 ml/min.

FIG. 16B is a chromatogram of absorbance versus time in a protein separation test using a strong anion exchanger at a flow rate of 4 ml/min.

DETAILED DESCRIPTION

A. General

Figure 1A:
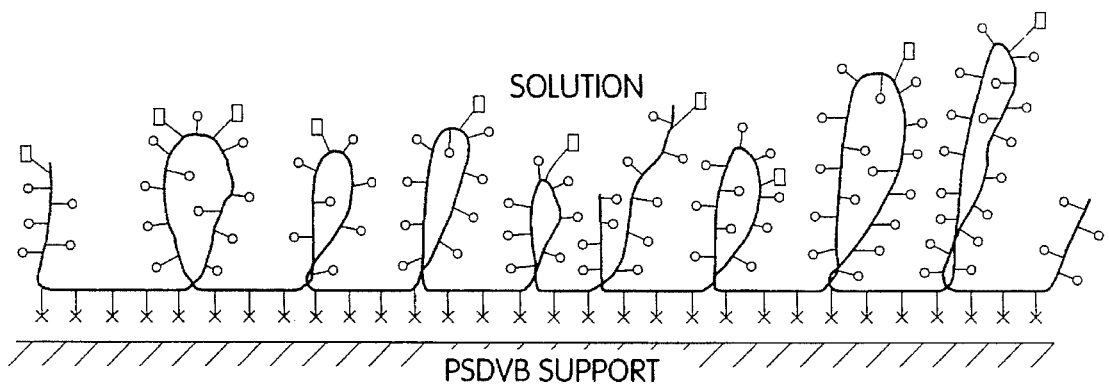
FIGS. 1A, 1B and 1C are a schematic illustration of the synthesis of a hydrophilic coating covalently attached to the surface of a PS-DVB support.

The invention provides methods for fabricating hydrophilic coatings that are covalently attached to the hydrophobic surfaces of polymers such as polystyrene divinylbenzene (PS-DVB). Utilizing the methods of the invention, hydrophilic coatings covalently attached to the hydrophobic surfaces may be constructed which are stable over a wide pH range, which are readily derivatizable and which may be used in a wide range of protein separation techniques.

To form the covalent hydrophilic coatings, a polymer having a hydrophobic surface comprising an unsaturated group is provided. A first compound also is provided, comprising a hydrophilic domain and a hydrophobic domain, wherein the hydrophobic domain comprises an unsaturated group. In one embodiment, a first compound, free of poly(glycidyl methacrylate), is provided. In another embodiment, a first compound, free of methacrylic acid, is provided. The hydrophobic surface of the polymer is contacted with a liquid phase, hydrophilic with respect to the surface, containing solvated molecules of the first compound. The molecules of the first compound thereby are deposited on the hydrophobic surface oriented with their hydrophobic domains oriented toward and adsorbed onto the surface, and with their hydrophilic domain extending outwardly from the surface into the liquid phase. The unsaturated group on the hydrophobic domain of molecules of the first compound then is crosslinked to the unsaturated groups on the hydrophobic surface to produce a hydrophilic coating covalently bound to the surface of the polymer, e.g., via a free radical reaction. The orientation of the hydrophobic domains comprising the unsaturated group towards the hydrophobic surface comprising an unsaturated group facilitates the crosslinking step.

In one embodiment, hydrophilic coatings may be covalently attached to the surface of polystyrene crosslinked with divinylbenzene (PS-DVB) particles. PS-DVB particles may be manufactured by methods described in the prior art. (See, e.g., Kun et al., *J. Polymer Sci.* Part C, No. 16, pp. 1457–1469 (1967); *J. Polymer Sci.*, Part A1, Vol. 6, pp. 2689–2701 (1968); and Ugelstad, U.S. Pat. No. 4,186,120 (1980)). These and other technologies, known to those skilled in the art, disclose the conditions of emulsion and suspension polymerization, or the hybrid technique disclosed in a Ugelstad patent, which permit the production of polystyrene divinylbenzene particles. After the polymerization process, double bonds remain on the PS-DVB surface. Malinsky et al., *J. Macromol. Sci. Chem.*, A5:1071 (1971). The fraction of the divinylbenzene in the reaction mixture may be increased in the polymerization process, to increase the mechanical strength of PS-DVB, and to increase the number of double bonds.

According to the method of the invention, the unsaturated groups on the PS-DVB surface may be reacted with an unsaturated group on a hydrophobic region of a compound comprising a hydrophilic group, to form a hydrophilic coating covalently attached to the PS-DVB surface. In one embodiment, hydrophilic coatings may be covalently attached to POROS perfusive PS-DVB particles (PerSeptive Biosystems, Inc. Cambridge, Mass.). Perfusive PS-DVB particles are described in U.S. Pat. No. 5,019,270 (1991), the disclosure of which is incorporated herein by reference. The geometries of the throughpores of perfusive PS-DVB particles are designed to provide a high surface area for solute interaction and to permit very high fluid velocities without a loss of resolution in many chromatography applications. In a preferred embodiment, covalently coated POROS R/H and POROS R/M perfusive PS-DVB chromatography matrix particles (PerSeptive Biosystems, Inc., Cambridge, Mass.) may be fabricated. The H and M material comprise 10 micron and 20 micron diameter particles respectively. The density of surface vinyl groups in these products is approximately 0.23 mmol/g as measured by a mercuric acetate titration procedure of the type disclosed in Das, *Anal. Chem.*, 26:1086 (1954). These materials thus are useful in the practice of the invention, since they have a high surface density of unsaturated groups.

Figure 1B:
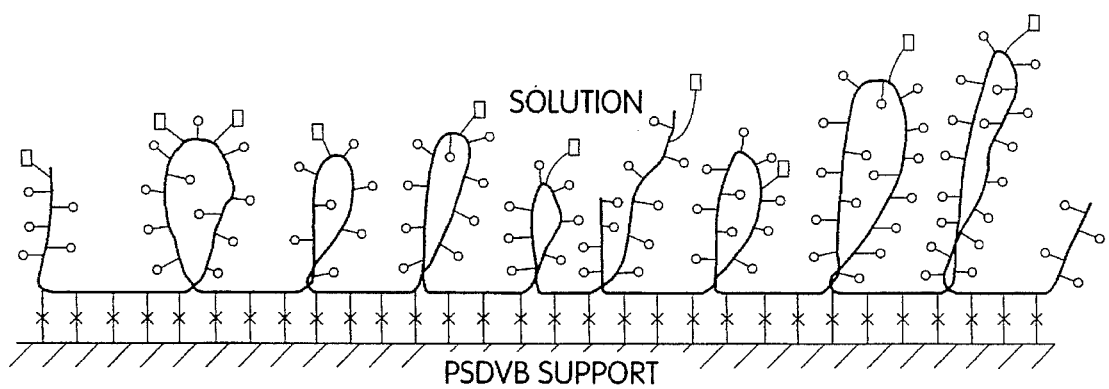
Figure 1C:
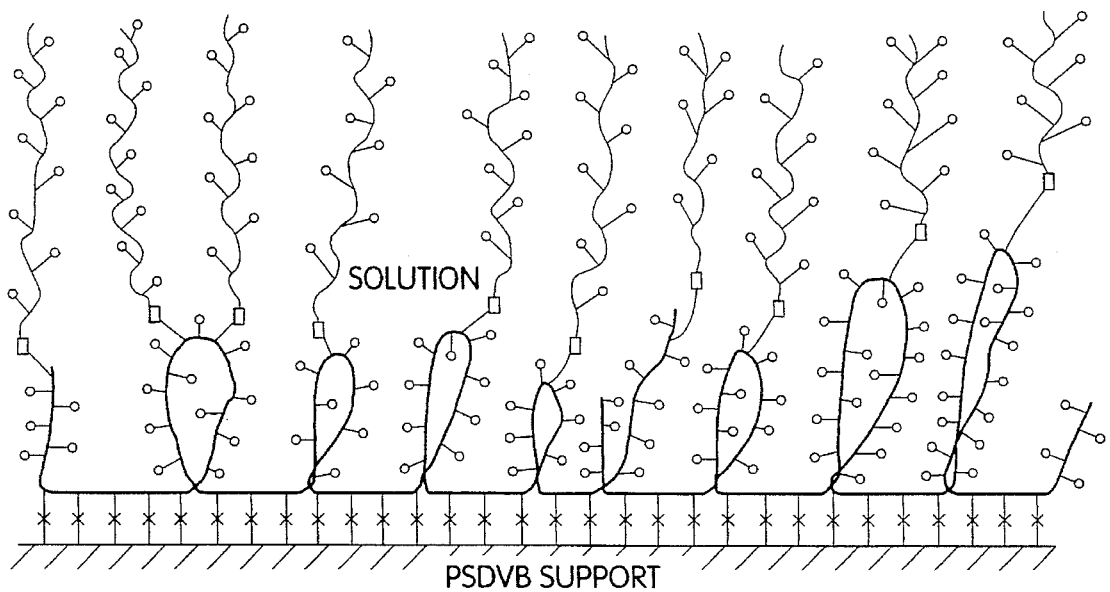

The method of the invention permits hydrophilic coatings to be covalently attached to the hydrophobic surfaces of PS-DVB, which are stable in a wide range of chromatography conditions, such as ranges of pH and ionic strength. In one embodiment, the hydrophilic coating may comprise a fimbriate structure. FIGS. 1A–1C illustrate schematically the construction of a hydrophilic coating comprising a fimbriate structure covalently bound to a PS-DVB surface. As illustrated in FIG. 1A, a polymer comprising hydrophobic and hydrophilic domains is adsorbed in solution onto the surface of a hydrophobic PS-DVB support. The hydrophilic domains of the polymer includes hydrophilic groups, represented by open circles in FIG. 1. The hydrophobic domains, represented by X's, of the polymer are adsorbed onto the hydrophobic surface by hydrophobic-hydrophobic interaction. Unsaturated groups in the hydrophobic region X of the polymer then are reacted by a free radical reaction with unsaturated groups on the surface of PS-DVB to form a covalently attached hydrophilic coating as illustrated in FIG. 1B. To increase the hydrophilicity, the coating then is derivatized to include further hydrophilic groups. To derivatize the coating, reactive groups in the polymer coating, represented in FIG. 1 by an open square, may be reacted with a compound comprising further hydrophilic groups (open circles). This produces a hydrophilic coating having a fimbrate structure, comprising elongate polymer chains which extend from the surface as illustrated in FIG. 1C.

The fimbriate hydrophilic coating envelopes and is covalently attached to the hydrophobic surface. The polymer chains comprising hydrophilic groups are present in the coating at a surface density sufficient effectively to mask the hydrophobic surface and substantially to eliminate hydrophobic interaction between a protein solution and areas of the hydrophobic surface. The hydrophilic groups on the polymer chains of the fimbriate coating may comprise, e.g., a hydroxyl, carboxylic acid, quaternary amine or sulfonic acid. Thus, hydrophilic coatings may be covalently attached to hydrophobic surfaces of polymers such as PS-DVB particles, to produce hydrophilic coated particles which may be used in a wide range of chromatography applications.

B. Modified Polyvinyl Alcohol-Based Coatings.

Figure 2:
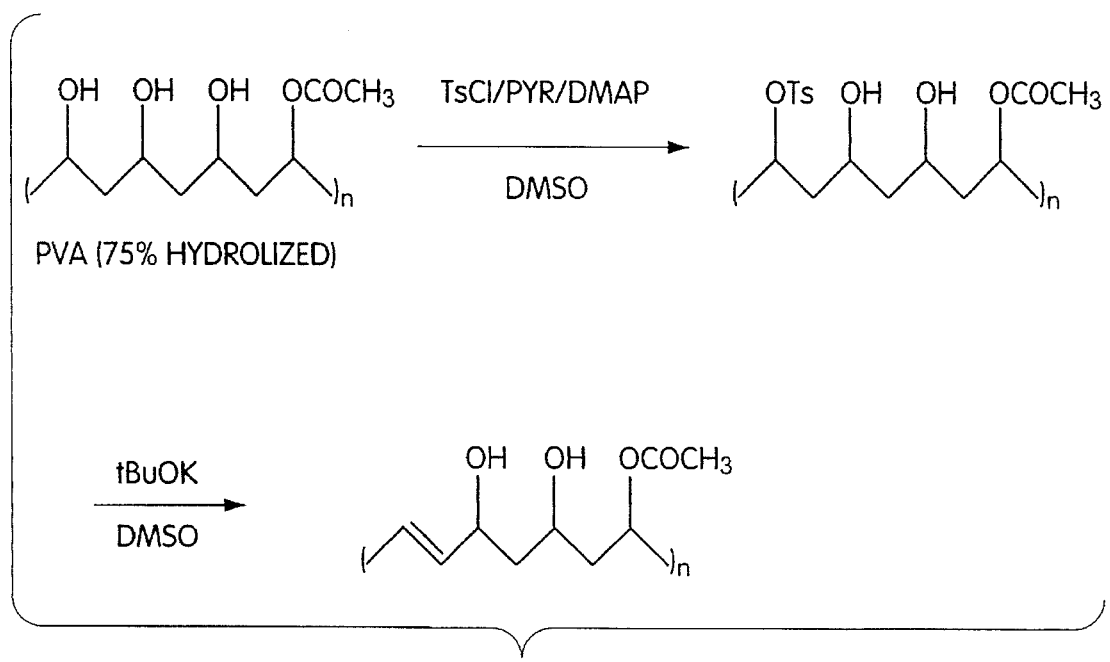
FIG. 2 is a reaction scheme illustrating the synthesis of modified polyvinyl alcohol (PVA).

In one embodiment, a first compound comprising modified polyvinyl alcohol (PVA), may be covalently attached to the hydrophobic surface of a polymer such as polystyrene divinyl benzene (PS-DVB), to produce a covalent hydrophilic coating. Modified PVA molecules may be synthesized by tosylating approximately one quarter of the hydroxyl groups on polyvinyl alcohol (PVA) polymer (75% hydrolyzed) to create good leaving groups. T-butoxide is then used in an elimination reaction to form unsaturated groups on the PVA molecules, as described in Example 1. The reaction scheme is shown in FIG. 2. When treated with t-butoxide in DMSO, tosylated secondary hydroxyl groups afford exclusively elimination products. Snider and Soho, *J. Org. Chem.*, 29:742 (1964). As illustrated in FIG. 2, modified polyvinyl alcohol has a hydrophilic domain comprising hydroxyl groups and a hydrophobic domain, comprising unsaturated groups.

The modified PVA may be utilized to produce a covalent hydrophilic coating on the hydrophobic surface of a PS-DVB polymer, such as POROS RH (PerSeptive Biosystems, Inc., Cambridge, Mass.). In this embodiment, PS-DVB polymer beads are added to a solution of the modified PVA dissolved in a polar solvent system, such as a DMSO-isopropanol mixture, to drive the adsorption of the double bonds on the modified PVA molecules to the PS-DVB surface, until the surface of PS-DVB is completely coated. The driving force is minimization of the hydrophobic contact area of the hydrophobic domains of the modified PVA molecules and the PS-DVB surface with the polar solvant. The hydroxyl-rich hydrophilic domains of the modified PVA, in contrast, extend out into the solvent. At equilibrium, the adsorbed modified PVA molecules probably have a loop and train appearance on PS-DVB surface as shown in FIG. 1A. The coated PS-DVB beads can be readily dispersed in water.

Figure 3:
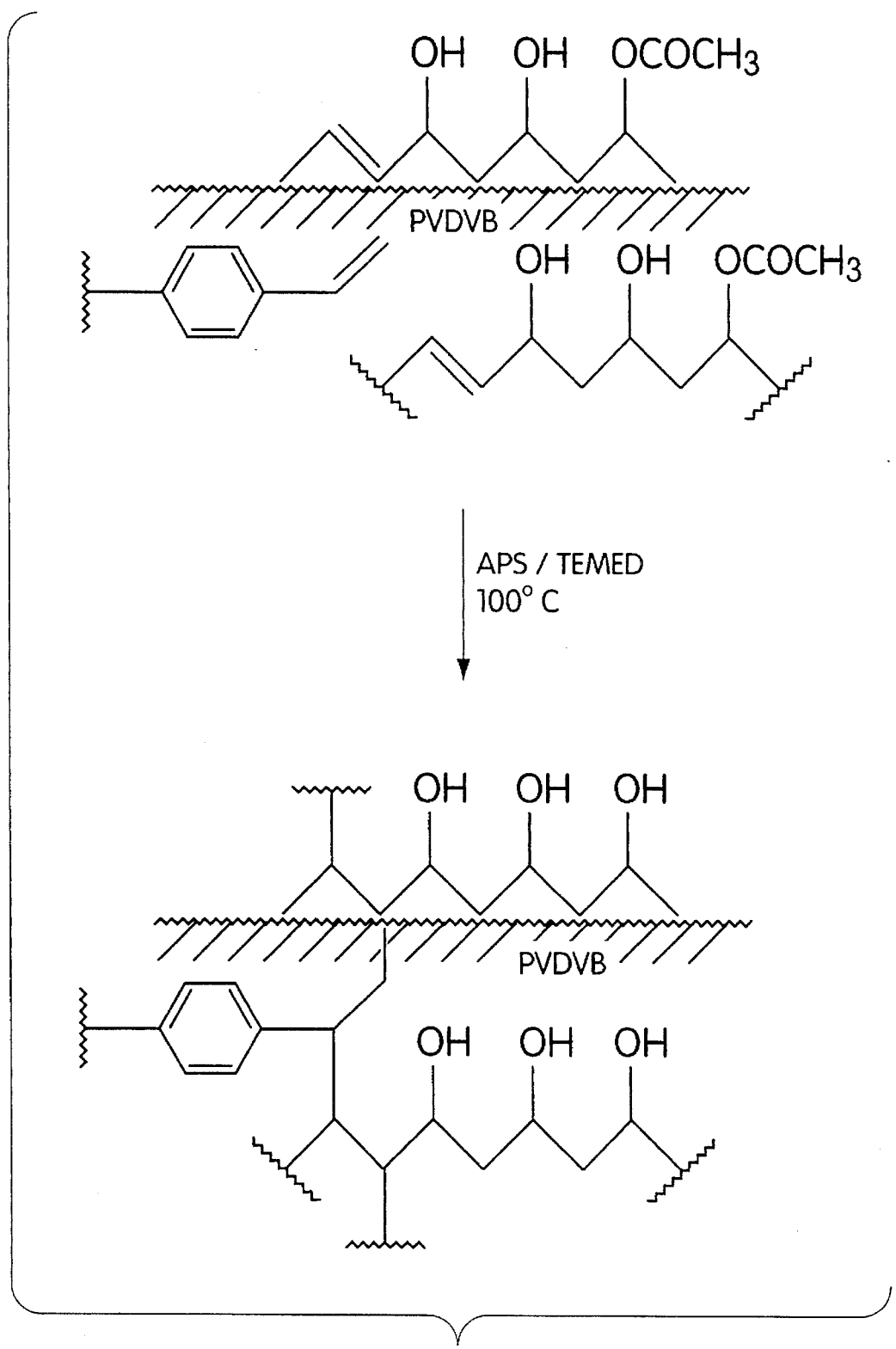
FIG. 3 is a possible reaction scheme for the crosslinking of modified PVA with the surface of a PS-DVB polymer.

Covalent crosslinking of the unsaturated groups on the hydrophobic domain of the PVA molecules with the unsaturated groups on the Poros™ PS-DVB surface may be accomplished in one embodiment by a free radical reaction using ammonium persulfate (APS) and N,N,N',N' tetramethylethylene diamine (TEMED) in an aqueous solution at reflux, as described in the Example 1. The covalent attachment of a hydrophilic modified PVA coating to a PS-DVB support is illustrated schematically in FIGS. 1A and 1B. The orientation of unsaturated groups in the hydrophobic domain of the modified PVA molecules in the aqueous solution towards the PS-DVB surface facilitates the reaction. Covalent bonds also can be formed between adjacent PVA molecules adsorbed on the PS-DVB surface. A possible reaction scheme for the crosslinking process in shown in FIG. 3. The use of PVA is advantageous because further derivatizations may be accomplished through the hydroxyl groups on the coating.

C. Derivatization of Modified PVA Coatings

Figure 4:
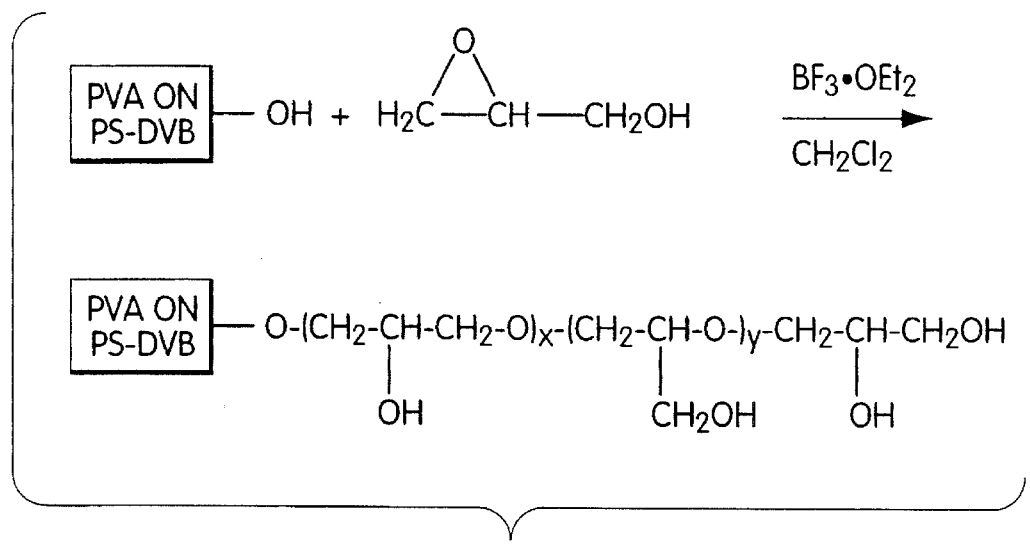
FIG. 4 is a reaction scheme for the reaction of a modified PVA coated PS-DVB polymer with glycidol.

The hydroxyl groups on the covalent PVA coating on the PS-DVB surface may be derivatized by reaction with a second compound comprising a hydrophilic moiety to increase the hydrophilicity of the coating. The hydroxyl groups on the PVA coating may be derivatized, e.g., as shown in FIG. 4, with molecules of glycidol through a ring opening reaction with borontrifluoride etherate, as described in Example 1. In the reaction, polymeric glycidol is grafted onto the hydroxyl groups of the coating through ether linkages, to produce a fimbriate surface comprising hydrophilic tentacles extending from the surface illustrated schematically in FIG. 1C. Thus, long fimbriate hydrophilic chains comprising plural hydroxyl groups are grafted to the short hydrophilic loops of the modified PVA coating. This improves loading capacity and hydrophilicity, and effectively masks any remaining hydrophobic surface. The hydrophilic chains comprising hydroxyl groups mask the hydrophobic surface of the PS-DVB and permit more efficient protein separation. The glycidol treated PVA coating is hydrophilic, neutral and stable in a pH range of 2–12.

Figure 5:
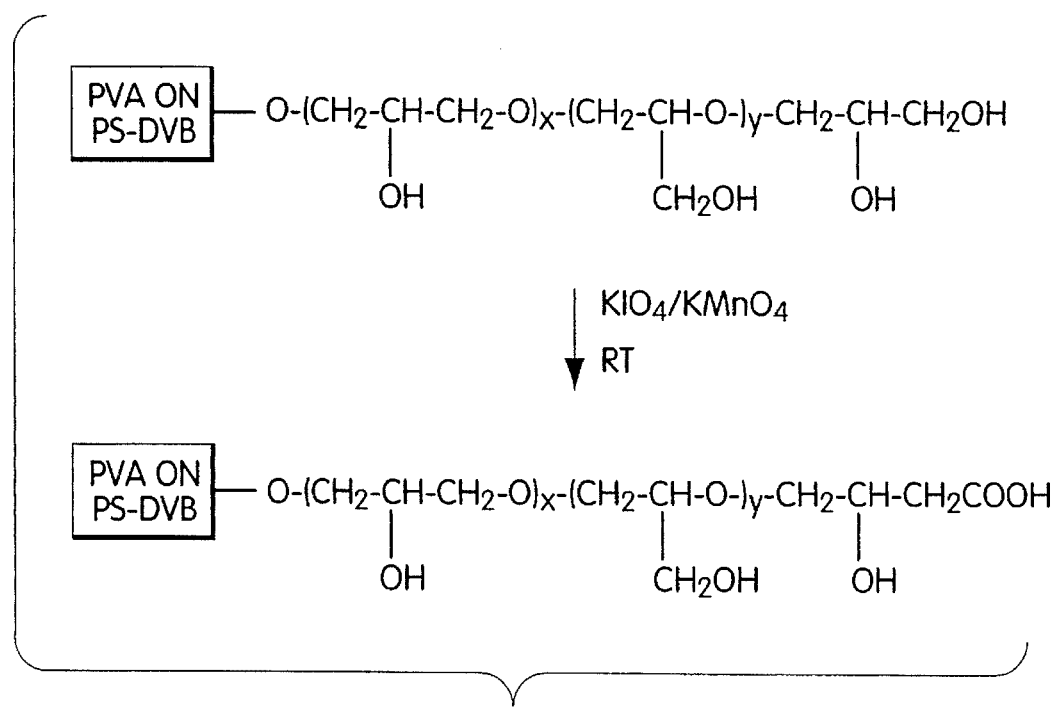
FIG. 5 is a reaction scheme for the derivatization of a PVA coated PS-DVB surface to produce carboxylic acid groups to form a weak cation exchanger.

Modified PVA coated PS-DVB polymers may be derivatized to form a hydrophilic coating comprising a cation or anion exchanger. Hydrophilic coated POROS supports thus may be synthesized which maintain the perfusion properties of the untreated POROS support, and demonstrate good performance in protein separations. A weak cation exchanger may be prepared as described in Example 1. As illustrated in FIG. 5, the alcohol groups on the glycidol treated PVA coated PS-DVB may be oxidized with periodate and potassium permanganate to produce carboxylic acid groups, to form a weak cation exchanger. The matrix can be used at high flow rates, e.g., 4 ml/min, without loss in resolution.

Figure 6:
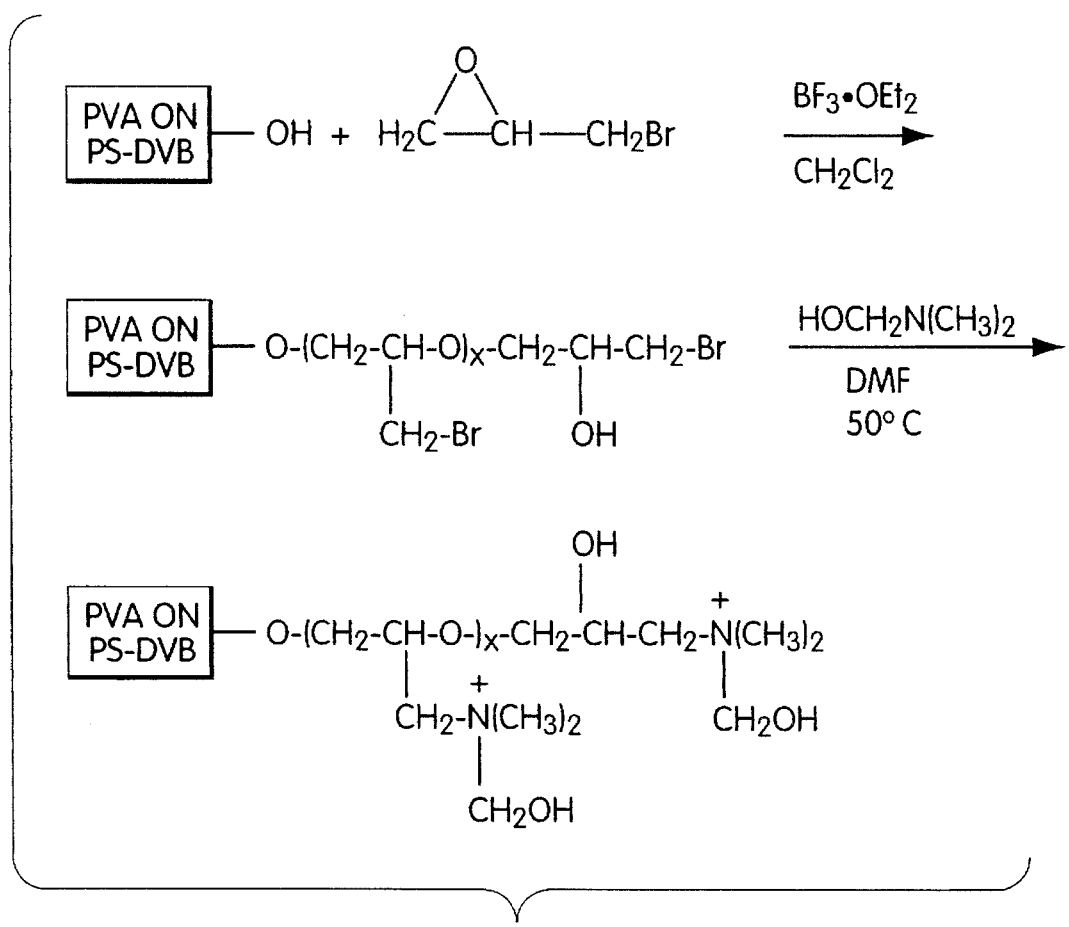
FIG. 6 is a, reaction scheme for the derivatization of a PVA coated PS-DVB surface to produce quarternary amines to form a strong anion exchanger.

In another embodiment, the modified PVA coated PS-DVB can be derivatized to form a strong anion exchanger. A strong anion exchanger may be formed by introducing a halogen to the PVA coating, and then substituting the halogen with a tertiary amine. As illustrated in FIG. 6, hydroxyl groups on the modified PVA coating can be reacted with an epihalohydrin, e.g., epibromohydrin and a catalyst such as borontrifluoride etherate, to produce short halogenated, e.g., brominated chains in the PVA coating. A substitution reaction with a nucleophilic amine, such as dimethylethanolamine, then produces quaternary amines on the coating, as described in Example 1.

D. Poly(Glycidyl Methacrylate) Coatings

Figure 7:
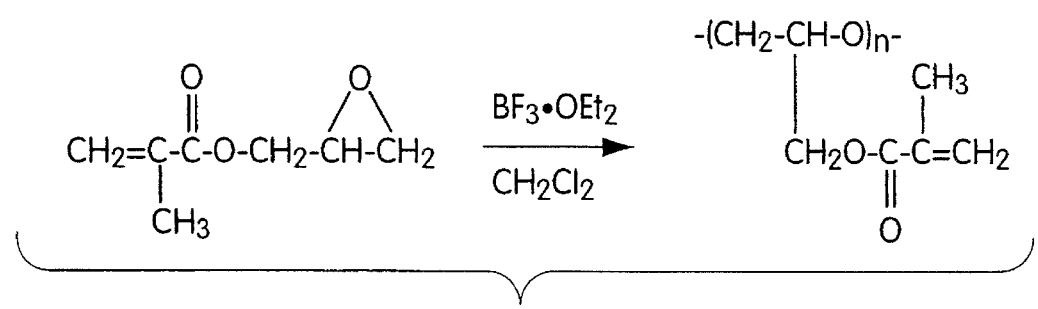
FIG. 7 is a reaction scheme illustrating the synthesis of polymeric glycidyl methacrylate.

In another embodiment, the unsaturated groups on the surface of a hydrophobic polymer such as PS-DVB may be reacted with a first compound comprising poly(glycidyl methacrylate), free of methacrylic acid, to provide a covalent hydrophilic coating on the surface of the PS-DVB. Polymeric glycidyl methacrylate is produced from glycidyl methacrylate through a ring opening polymerization reaction catalyzed by a borontrifluoride etherate as described, e.g., in U.S. Pat. No. 5,030,325 (1991). The reaction scheme is shown in FIG. 7. The resulting polymer has a polyether backbone with methacrylate groups on each repeating unit. Plasma Desorption Mass Spectrometry (PDMS) analysis of the polymeric glycidyl methacrylate product indicated that the reaction produced a mixture of polymethacrylates with chain lengths from 3 to 15, predominantly 4 to 11, primarily in linear form rather than cyclic structures.

The PS-DVB is added to a mixed solvent of water-isopropanol or water-PEG containing solvated molecules of poly(glycidyl methacrylate). The former is preferred because it has lower viscosity and tends to give a better coating. Brief degassing and brief sonication are necessary to disperse the PS-DVB in the solvent system, to remove air trapped inside the pores, and to allow the polymer to penetrate into the pores. In the solvent system, the molecules of poly(glycidyl methacrylate) orient with their hydrophobic domains comprising an unsaturated group toward the hydrophobic surface of PS-DVB, which facilitates the reaction. The synthesis of poly(glycidyl methacrylate) and adsorption to PS-DVB to form a noncovalent coating is described in U.S. Pat. No. 5,030,352 (1991), the disclosure of which is incorporated herein by reference. The reference indicates that the non-covalent poly(glycidyl methacrylate) coating can be derivatized by reaction with methacrylic acid in the presence of ammonium persulfate and TEMED. The reference, however, does not disclose that covalent bonds are formed between the crosslinked poly(glycidyl methacrylate) coating and the PS-DVB surface.

Figure 8:
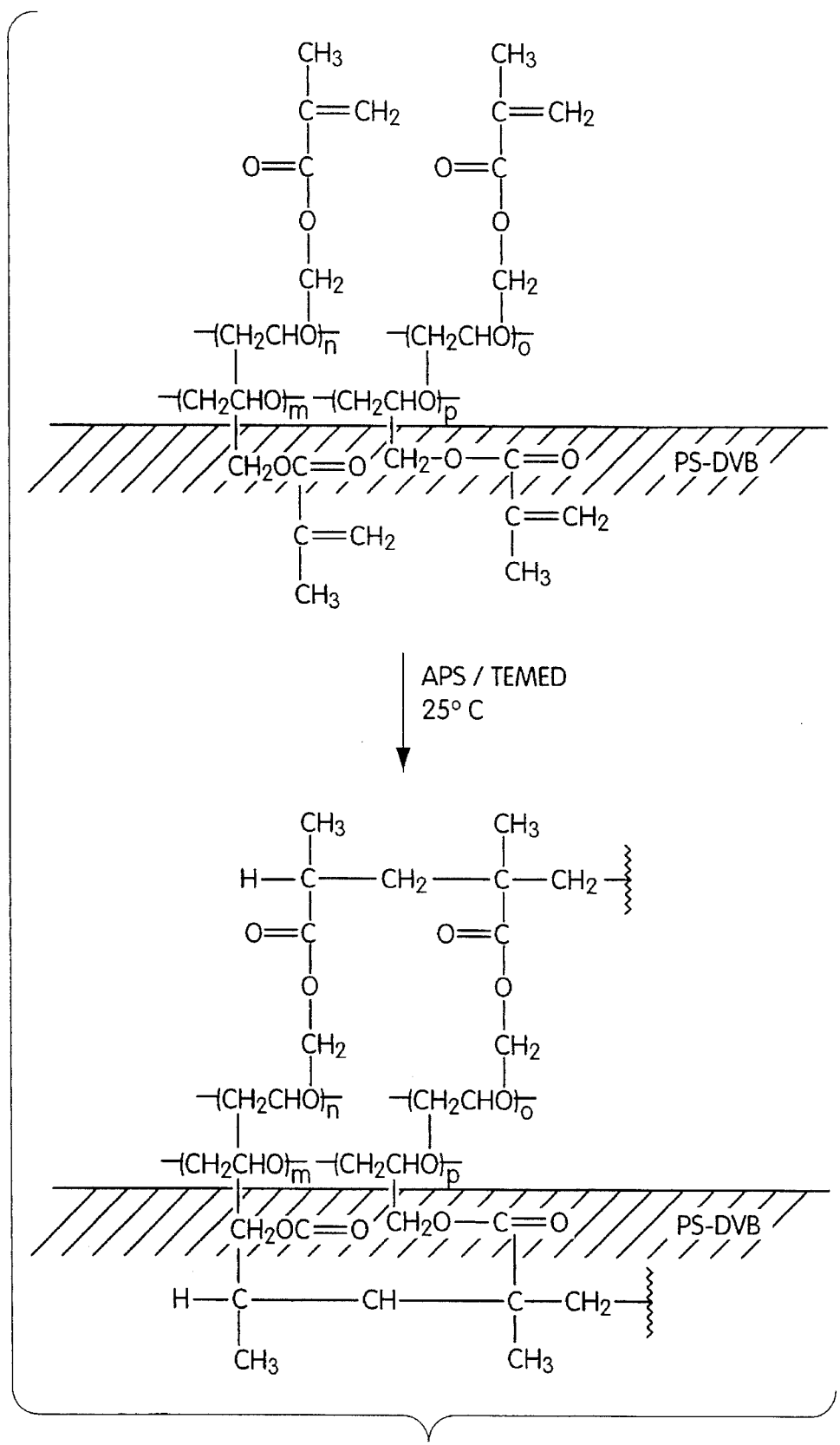
FIG. 8 is a reaction scheme of the reaction of poly(glycidyl methacrylate) with a PS-DVB polymer surface.

The unsaturated groups on the hydrophobic domain of the poly(glycidyl methacrylate) then may be crosslinked with unsaturated groups on the surface of PS-DVB, through a radical crosslinking reaction, shown in FIG. 8. The radical crosslinking reaction may be performed in an aqueous solution of ammonium persulfate (APS) and TEMED. Crosslinking of the individual polymer chains also occurs. Styrene and methacrylates have been co-polymerized by free radical polymerization. H. R. Allcock and F. W. Lampe, "Contemporary Polymer Chemistry", 2nd Ed., Prentice-Hall Inc., 1990. The coated PS-DVB was evaluated by chromatographic methods and demonstrated to be hydrophilic. In the reaction, the vinyl groups on the PS-DVB polymer react to form carbon-carbon bonds, which eliminates unreacted vinyl groups in the polymer. This is advantageous because vinyl groups have been found to deteriorate chromatographic performance of PS-DVB polymers, since they can undergo addition reactions in some conditions. Das, *Anal. Chem.*, 26:1086 (1954).

Through hydrolysis of the poly(glycidyl methacrylate) coating in strong base followed by titration of carboxyl groups covalently bound to PS-DVB, the density of carboxylic acid groups on the PS-DVB surface was found to be approximately 8.1 mmol/g. This indicated that carbon-carbon bonds form between the poly(glycidyl methacrylate) coating and the PS-DVB polymer in the crosslinking step.

E. Derivatization of Poly (Glycidyl Methacrylate) Coatings

Figure 9A:
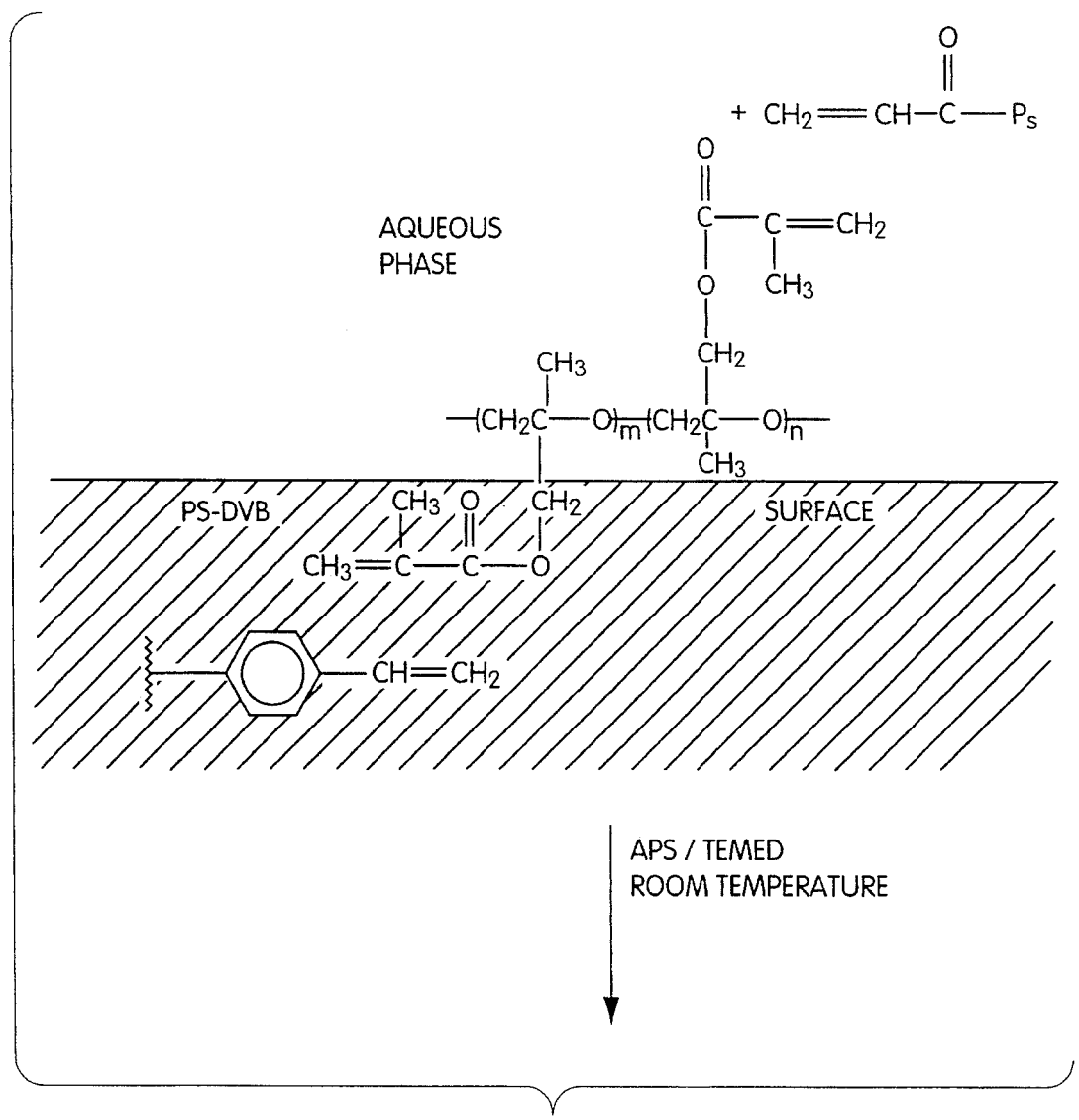
FIGS. 9A and 9B are a possible reaction scheme for the reaction of PS-DVB with poly(glycidyl methacrylate) and a second compound comprising an unsaturated group and a hydrophilic functional group.
Figure 9B:
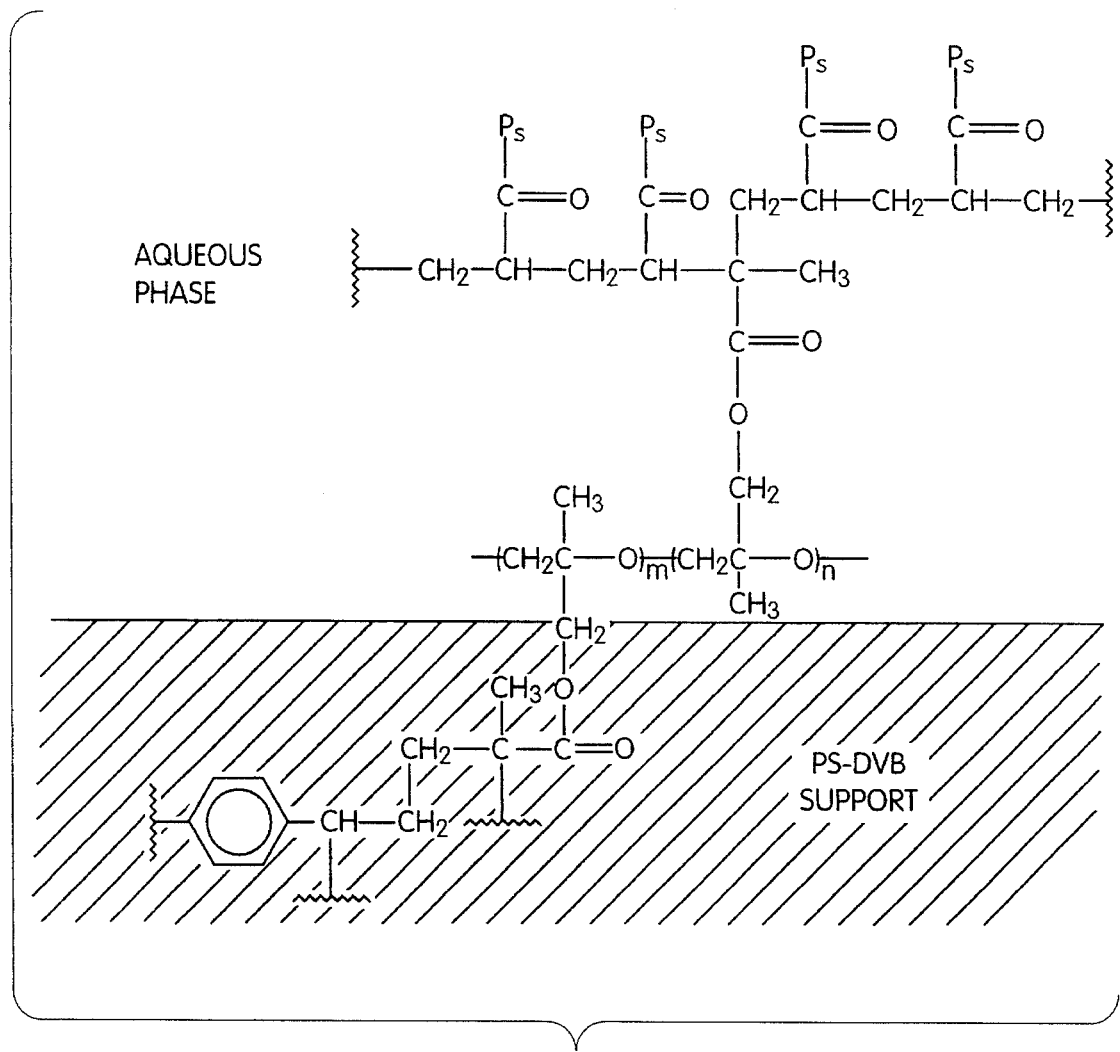

The poly(glycidyl methacrylate) coated PS-DVB can be derivatized by reaction with a second compound, comprising a hydrophilic moiety, to produce a variety of derivatized coated polymers. The reaction of poly(glycidyl methacrylate) with the surface of PS-DVB, as well as with a second compound comprising a hydrophilic group, can be implemented in one step, as shown in FIGS. 9A and 9B. The second compound includes an unsaturated group which reacts with an unsaturated group on poly(glycidyl methacrylate). The second compound also contains a functional group (symbolized as $P_s$), which is useful as a stationary phase and is hydrophilic.

For example, the poly(glycidyl methacrylate) coated PS-DVB can be reacted with a second compound, such as acrylic acid, to introduce carboxylic acid groups to the coating, to form a weak cation exchanger. In the reaction, the unsaturated groups on the poly(glycidyl methacrylate) are reacted with unsaturated groups on molecules of acrylic acid. Crosslinking of PS-DVB with poly(glycidyl methacrylate), and of poly(glycidyl methacrylate) with acrylic acid can be implemented in one step with a radical initiator.

In another embodiment, a strong cation exchange sorbent is synthesized by reacting the unsaturated groups in poly(glycidyl methacrylate) coated PS-DVB with unsaturated groups in a second compound, 2-acrylamido-2-methyl-1-propanesulfonic acid, through a free radical reaction. The 2-acrylamido-2-methyl-1-propanesulfonic acid contains a hydrophilic sulfonic acid group and a double bond. Alternatively, the second compound may comprise 2-acrylamidoglycolic acid, which, upon crosslinking to the coating, forms a weak cation exchanger. Itaconic acid, which contains two carboxylic acid groups, also may be used to prepare a weak cation exchange material. To form a strong anion exchanger, the second compound may comprise [3-(methacryolylamino) propyl] trimethyl ammonium chloride. Alternatively, the second compound may comprise any functional group that is useful as a chromatographic stationary phase. For example, to form hydrophobic interaction chromatography (HIC) materials, the second compound may comprise, e.g., ethyl vinyl ketone.

All of the derivatized poly(glycidyl methacrylate) coatings have fimbriate surfaces, and an extraordinarily high protein loading capacity. Dynamic loading capacity of the cation exchangers for lysozyme ranged from 80 mg/g to 144 mg/g and dynamic loading capacity for the anion exchanger for bovine serum albumin was approximately 90 mg/g.

Thus, the methods disclosed herein enable hydrophilic coatings to be fabricated on hydrophobic surfaces such as PS-DVB which are stable to a wide range of chromatography conditions, and which can be derivatized for use in a wide range of chromatography applications. In one embodiment, covalent coatings may be constructed on hydrophobic perfusive PS-DVB particles to produce a hydrophilic coated chromatography matrix with an extraordinary loading capacity, which enables proteins and other molecules to be separated rapidly at high flow rates.

Example 1: Modified PVA-Coated PS-DVB

Synthesis of Modified PVA

Polyvinyl alcohol (Aldrich, Milwaukee, WI; MW 2000, 75% hydrolyzed, 1.02 g) was dissolved in 20 ml of dried DMSO to which p-toluenesulfonyl chloride (Aldrich, 99%, 2.48 g, 0,013 mol), dried pyridine (Aldrich, 0.5 ml) and 4-dimethylaminopyridine (DMAP) (Aldrich, , 99% 0.02 g) were added. The mixture was magnetically stirred under a nitrogen atmosphere for 24 hours at room temperature. Several drops of hexane were then added to precipitate the polymer which was subsequently filtered and washed with diethyl ether, finally the polymer was dried under vacuum. Distilled N,N'-disopropylethylamine (Aldrich, 1.2 ml) and potassium t-butoxide (Aldrich, 1.46 g) were mixed into 20 ml of dried DMSO and this solution was transferred into the reaction mixture of the first reaction through a syringe. The mixture was stirred at room temperature for 12 hours and then heated to 50° C. for 2 hours. To isolate the product, the modified polymer was precipitated through the addition of several drops of hexanes, filtered and washed by 10 ml of hexanes and finally dried under vacuum.

Synthesis of Modified PVA Coated PS-DVB

The final product of the PVA modification reaction was transferred to a 50 ml round-bottom flask and dissolved in 20 ml of DMSO. Isopropanol was added until the solution became slight cloudy. POROS R/H packing material (10 micron particle size, PerSeptive Biosystems, Cambridge, Mass. 1.5 g) was added to this mixture. After degassing and brief sonication, the mixture was shaken for 24 hours at room temperature. The packing material was then filtered and re-dispersed in 40 ml of water. After degassing and sonication, APS (Aldrich, 0.92 g) and TEMED (Bio-Rad, Richmond, CA) (40 µl) were added and the suspension was refluxed under gentle mechanical stirring for 20 hours. Potassium hydroxide (2.24 g) was added to the mixture, and the reaction was continued under refluxing for another 4 hours. The packing material was filtered and washed with water, methanol, and acetone and dried under vacuum.

Glycidol Treatment of PVA Coated PS-DVB

The PVA coated POROS R/H material (1.5 g) was dispersed in 30 ml of dichloromethane containing 0.5 ml of glycidol (Aldrich). The mixture was briefly degassed and sonicated. Two ml of dichloromethane and 40 µl borontrifluoride etherate (Aldrich) were mixed in a test tube, and the solution was added to the suspension dropwise with constant swirling. The reaction was carried out at room temperature with swirling for 20 minutes. Water (20 ml) was added to the mixture to stop the reaction and the packing material was filtered and washed with water, methanol and acetone, prior to drying under vacuum.

Esterification of the hydroxyl groups with trifluroacetic anhydride, followed by microanalysis, indicated that the number of hydroxyl groups increased almost 5 fold, which suggested that the hydrophilic chains were 4–5 units long on the average.

Protein recovery of the PVA-coated Poros™ in a 50×4.6 mm column after glycidol treatment was tested. PS-DVB supports adsorb proteins through hydrophobic interactions. Boardman and Patridge, *Biochem. J.*, 69:543 (1955). Repeated injections of a protein should result in a constant peak height if there is no irreversible adsorption of proteins. Chromatography was carried out with a Varian 5000 gradient pumping system (Walnut Creek, Calif.) coupled to a Waters Lamda-Max 481 variable wavelength detector (Milford, Mass.). Samples were injected into the system with a Rheodyne (Cotati, Calif.) injector valve equipped with a 20 µl loop. All separations were performed at ambient temperature.

Figure 10:
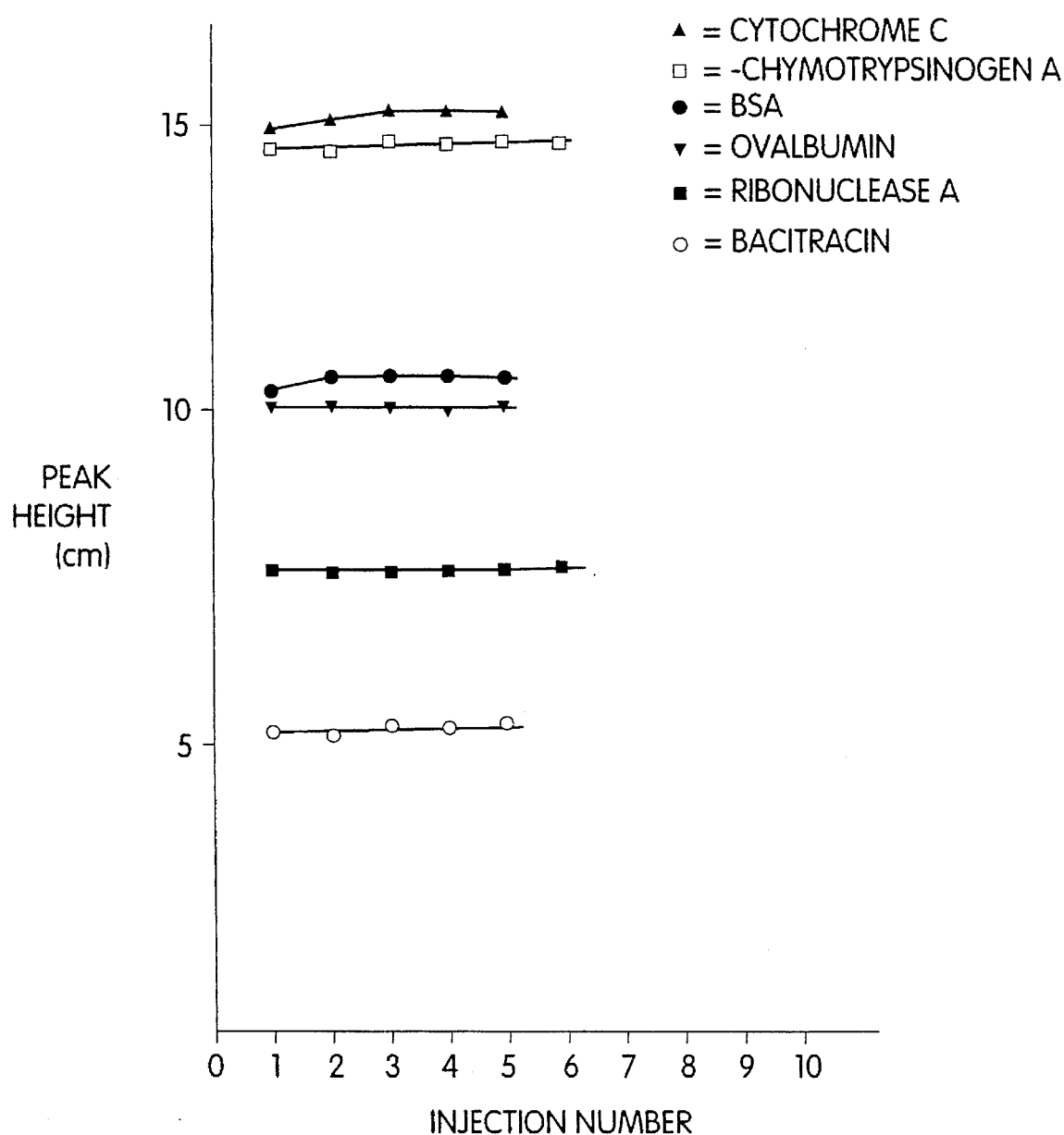
FIGS. 10 and 11 are graphs of peak height versus injection number in a series of tests of protein adsorption by a glycidol-treated PVA coated PS-DVB polymer.

The hydrophobic adsorption of protein solutions (5 mg/ml or 1 mg/ml) of cytochrome C, ribonuclease A, α-chymotrypsinogen, ovalbumin, bovine serum albumin and bacitracin (Sigma Chemicals, St. Louis, Mo.) were tested. Mobile phase was 0.05M phosphate buffer (pH 7 at 1 ml/min, with an injection volume of 20 µl). After each injection, the column was cleaned with 1% trifluoroacetic acid. FIG. 10 is a graph of peak height versus injection number for this test on the glycidyl treated modified PVA coating. As illustrated in FIG. 10, most of the proteins showed no or little adsorption.

Figure 11:
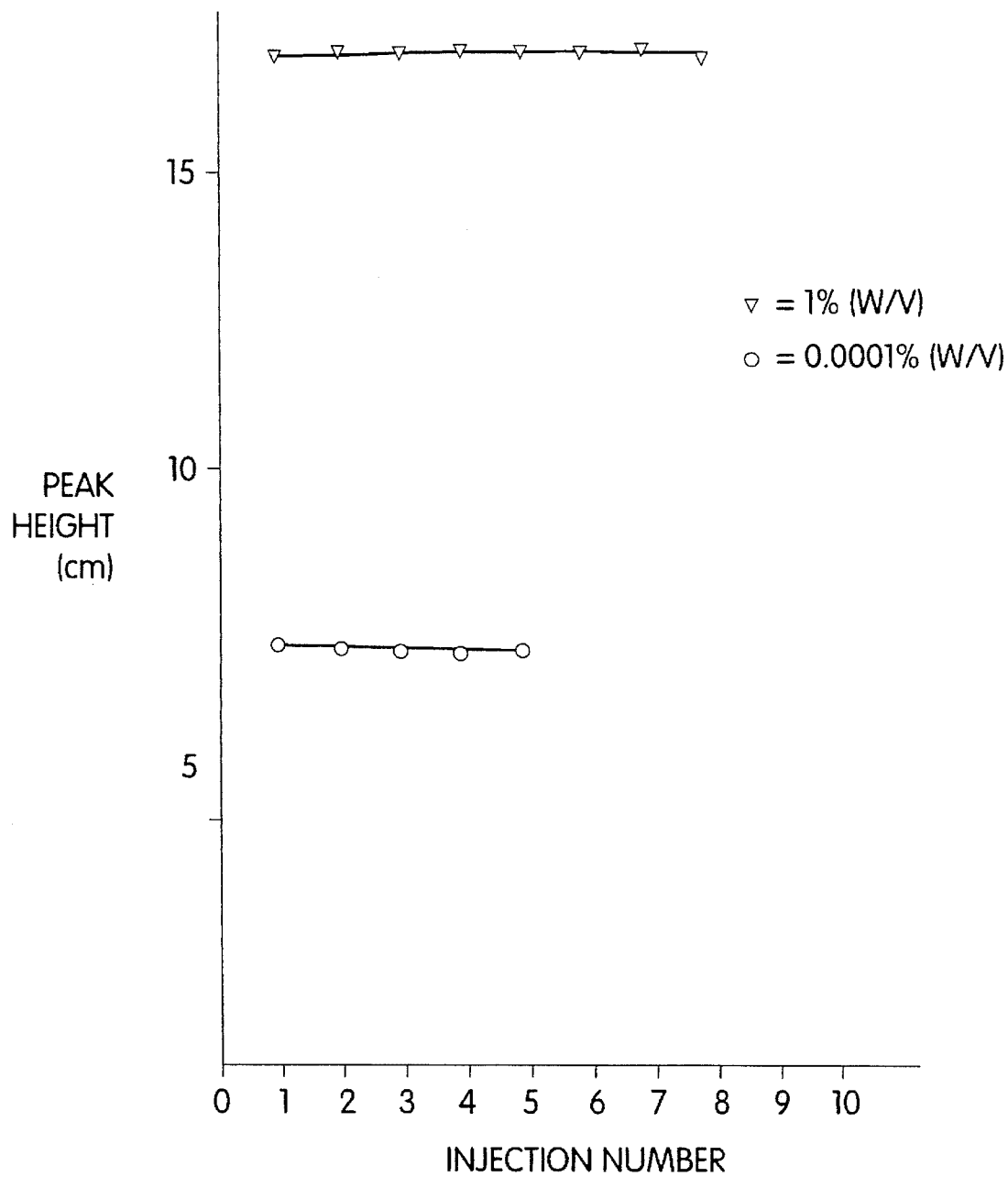

In another test, the adsorption of lysozyme at 1% (w/v) and 0.0001% (w/v) was examined. The results are shown in FIG. 11, which is a graph of peak height versus injection number. The peak height was constant at both concentrations illustrating that little or no adsorption of lysozyme occurred. Since an uncoated POROS column of the same size could adsorb 6400 µg of lysozyme, this illustrates that the glycidol treated PVA coating significantly reduced hydrophobic interaction with proteins in comparison with the uncoated PS-DVB matrix. The fimbriate hydrophilic coating thus masks the hydrophobic groups on the PS-DVB and enhances the chromatographic performance of the coated polymer.

Figure 12:
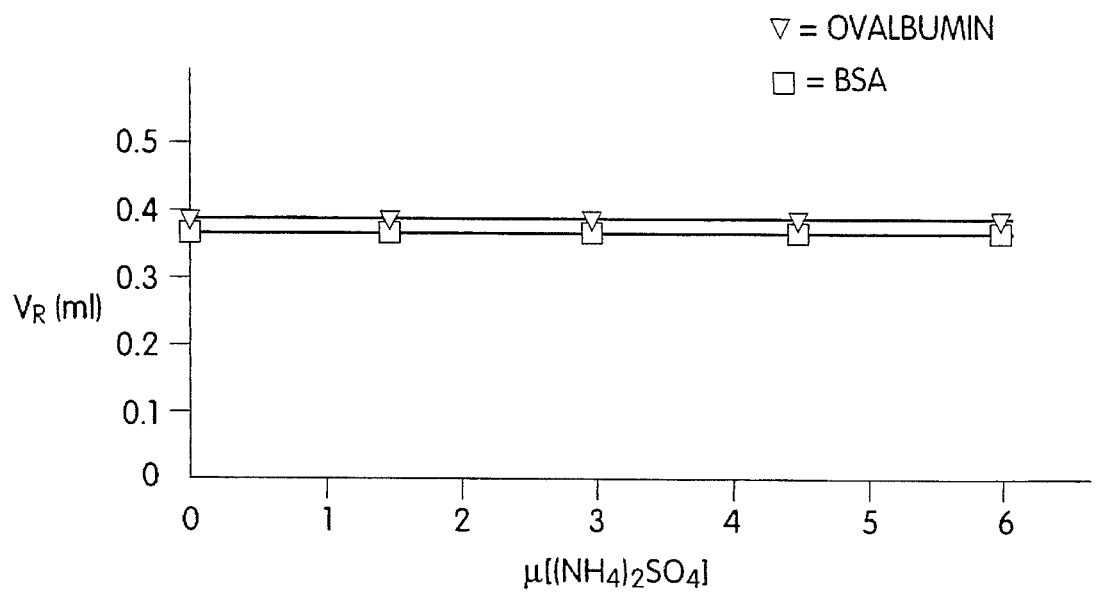
FIG. 12 is a graph of retention volume versus ammonium sulphate concentration on a glycidol treated PVA coating on PS-DVB.

The hydrophilicity of the coated polymer at high ionic strength also was tested. FIG. 12 is a graph of retention volume versus ammonium sulphate concentration on the glycidol treated PVA coating, for bovine serum albumin and ovalbumin. The mobile phase was ammonium sulfate in 0.01M phosphate buffer, pH 7, at 1 ml/min. FIG. 12 illustrates that at high ammonium sulfate concentration, there is no change in elution time for these proteins. This indicates that at high ionic strength, no hydrophobic interaction occurs between the coating and the proteins. The glycidol treated covalent PVA coating is hydrophilic, even at high ionic strength.

Figure 13:
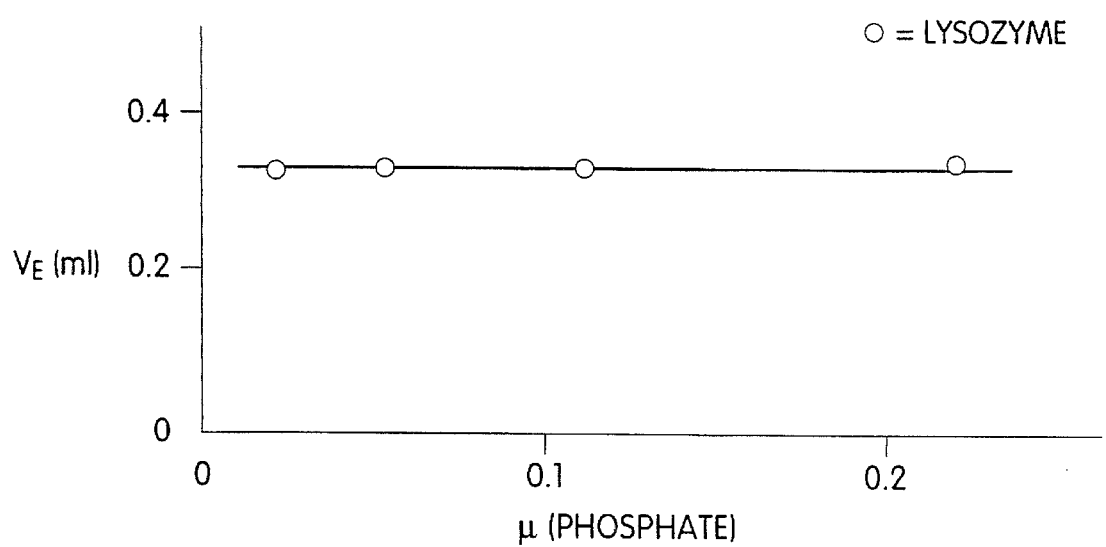
FIG. 13 is a graph of retention volume versus ionic strength of phosphate buffer for lysozyme on a glycidol treated PVA coated PS-DVB polymer.

The presence of charged groups on the surface of the glycidyl treated PVA coating was tested. The retention volume of the proteins, cytochrome C, ribonuclease A, α-chymotrypsinogen, ovalbumin, bovine serum albumin and bacitracin, was tested at pH 7 with phosphate buffer concentrations varying from 10 to 500 mm. The proteins showed no change of elution volume, suggesting that there is no ionic interaction between the proteins and the coating. A graph of retention volume versus ionic strength of phosphate buffer for lysozyme is shown in FIG. 13. The constant elution volume over a range of ionic strength indicates there were no acidic groups on the surface.

Figure 14:
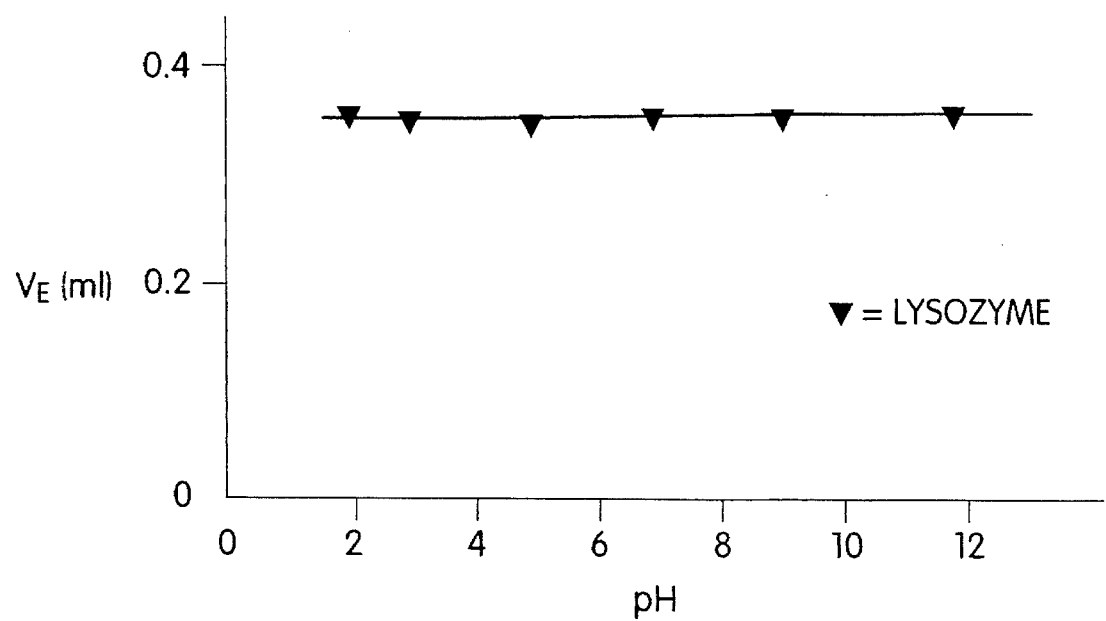
FIG. 14 is a graph of retention volume versus pH for lysozyme on a glycidol treated PVA coated PS-DVB polymer.

The pH stability of the coating was tested at pH 2–12. Constant elution volumes for both acidic and basic proteins (cytochrome C, ribonuclease A, α-chymotrypsinogen, ovalbumin, bovine serum albumin and bacitracin) were obtained over the entire pH range. FIG. 14 is a graph of elution volume versus pH for lysozyme. The same test was repeated twice after the column was washed with pH 2 and pH 12 mobile phases for 24 hours. Again, the same results were obtained. Thus, the coating is stable at extremes in pH.

Preparation of a Weak Cation Exchanger

The vicinal diols on the glycidol treated PVA coated PS-DVB were oxidized by the addition of potassium periodate (1.84 g, 8 mmol), potassium carbonate (0.28 g, 2 mmol) and potassium permanganate (0.024 g, 0.15 mmol) to 1 liter of deionized water with shaking to dissolve the three components. The glycidol treated Poros packing material (1 g) was dispersed in 70 ml of the oxidizing solution, and after thorough degassing and brief sonication, the mixture was shaken at room temperature for 12 hours. The packing material was then filtered and thoroughly washed with water. The weak cation exchanger had a static loading capacity of 49 mg/g and dynamic loading capacity of 44 mg/g. Acid-base titration indicated that the density of carboxylic acid groups was 0.9 mmol/g.

FIG. 15 demonstrates separation of the proteins myoglobin (1), ribonuclease A (2), cytochrome C (3) and lysozyme (4) using the weak cation exchanger. The mobile phase was: (A) 0.02M phosphate buffer, pH 6.5; and (B) A+0.5M NaCl. FIG. 15A is a chromatogram obtained at a flowrate of 1 ml/min, with a gradient of 0–100% B in 16 minutes. FIG. 15B is a chromatogram obtained at a much higher flowrate, 4 ml/min, with a gradient of 0–100% B in 4 minutes. FIG. 15 illustrates that high mobile phase velocity, there is no loss of resolution. At a flow rate of 4 ml/min, separation of the four proteins was achieved in less than 3.5 minutes. Most conventional ion exchangers experience a decline in resolution at higher than 1 ml/min flowrate. Afeyan et al., *J. Chromatography*, 519:1 (1990).

Preparation of a Strong Anion Exchanger

The PVA coated Poros R/H packing material (1 g) was dispersed in 20 ml of dichloromethane, degassed, and sonicated briefly followed by the addition of epibromohydrin (300 µl, Aldrich). Two ml of dichloromethane and 30 µl borontrifluoride etherate were mixed in a test tube and this solution was added dropwise to the packing material/epibromohydrin suspension with constant swirling. The reaction was continued for 20 minutes at room temperature with swirling. The packing material was filtered and washed with methanol and acetone, and finally dried under vacuum. The brominated Poros material was dispersed in 30 ml of a 10% (v/v) solution of dimethylethanolamine (Aldrich) in dimethylformamide (DMF). After degassing and sonicating, the mixture was mechanically stirred at 50° C. for 6 hours. The packing material was then filtered and washed with methanol and acetone prior to drying under vacuum. The strong anion exchanger had a static loading capacity of 50 mg/g and dynamic loading capacity of 42 mg/g.

The separation of myoglobin (1), conalbumin (2), ovalbumin (3) and soybean trypsin inhibitor (4) was tested using the strong anion exchanger and a mobile phase on a 50×4.6 mm column of: (A) 0.01M Tris-HCl buffer, pH 8; and (B) A+0.05M NaCl. FIG. 16A is a chromatogram obtained at 1 ml/min with a gradient of 0–100% in 16 min. FIG. 16B is a chromatrogram obtained at 4 ml/min with a gradient of 0–100% B in 4 min. Using the strong anion exchanger, the four proteins could be separated in less than four minutes. Thus, the hydrophilic coated PS-DVB maintained resolution even at very high flow rates.

Example 2: Poly(Glycidyl Methacrylate) Coated PS-DVB

Synthesis of Polymeric Glycidyl Methacrylate

One ml of freshly distilled glycidyl methacrylate (Aldrich) in 6 ml of dichloromethane was added to a 100 ml round-bottomed flask. Five µl of borontrifluoride etherate in 2 ml of dichloromethane were then added to the glycidyl methacrylate solution slowly with swirling. The round-bottomed flask was wrapped in aluminium foil and shaken at room temperature for 24 hours. Six ml of water then was added to stop the reaction, followed by 4 ml of isopropanol. Dichloromethane was removed from the mixture by vacuum evaporation, and about 16 ml of a water/isopropanol (70:30) solution was added to produce the polymeric glycidyl methacrylate. The dichloromethane was removed by vacuum evaporation, and the polymer was extracted with three 30 ml portions of diethyl ether. The extracts were combined, dried over anhydrous sodium sulfate, and filtered. Diethyl ether was removed by vacuum evaporation, and the isolated polymer was dried under high vacuum.

Synthesis of Poly(Glycidyl Methacrylate) Coated PS-DVB

One gram of POROS PS-DVB particles (PerSeptive Bio-Systems, Cambridge, Mass.) with a particle size of 10 µm and pore size of 1000 Å were added to the polymeric glycidyl methacrylate, and after brief sonication and degassing, the mixture was shaken for 24 hours at room temperature. After filtering and washing three times with 50 ml of water, the polymer coated PS-DVB beads were transferred into a three-necked flask. Thirty ml of 3% (w/v) ammonium persulfate solution and 20 µl of TEMED were added. After degassing and sonication, the crosslinking reaction was carried out at a room temperature under nitrogen for 24 hours. The reaction was quenched by the addition of 10 mg of hydroquinone. The coated polymer beads were washed thoroughly with water and methanol, and acetone and dried.

Figure 17:
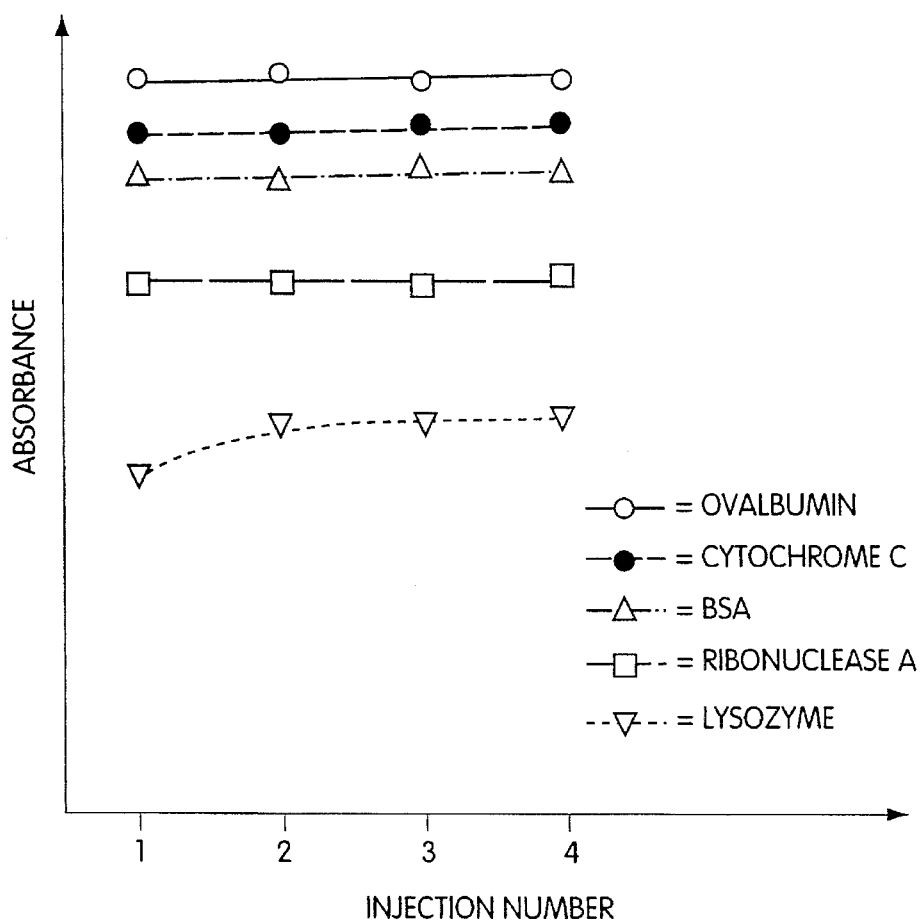
FIG. 17 is a graph of peak height (absorbance) versus injection number in a test of protein adsorption by a poly(glycidyl methacrylate) coated PS-DVB column.

Ovalbumin, bovine serum albumin, ribonuclease A, cytochrome C, and lysozyme were injected (20 µl) onto a 50×4.6 mm coated matrix column (1000 Å, 10 µm) with a mobile phase of 0.05M phosphate buffer at pH 7.0 and a flow rate of 1 ml/min. PS-DVB supports adsorb proteins through hydrophobic interactions. Boardman and Patridge, *Biochem. J.*, 69:543 (1955). Repeated injections of a protein should result in a constant peak height if there is no irreversible adsorption of proteins. The sample concentration was 0.5–1%. The results are shown in FIG. 17, a graph of peak height (absorbance at UV 280) versus injection number. FIG. 17 illustrates that most of the proteins tested did not show a peak height increase, except for lysozyme, which demonstrated a slight peak height increase from the first to the second injection. This indicated that there were a few residual hydrophobic spots.

Figure 18:
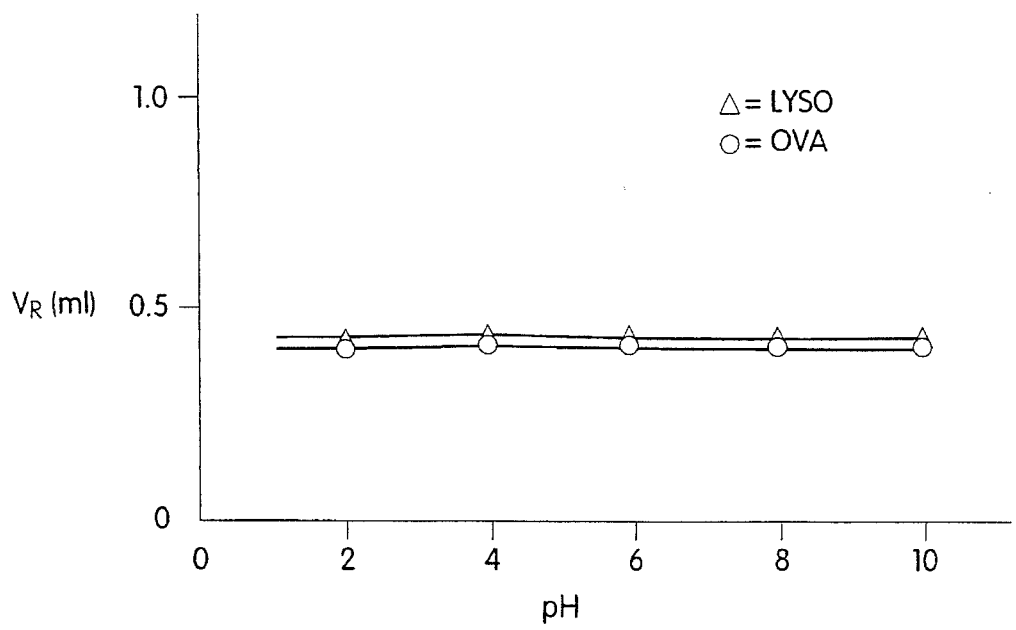
FIG. 18 is a graph of retention volume versus pH for ovalbumin and lysozyme on a poly(glycidyl methacrylate) coated PS-DVB column.

Chemical stability of the coating was evaluated by testing the coated polymer over the range of pH 2–10. FIG. 18 is a graph of retention volume versus pH, with a mobile phase of 0.05M phosphate buffer at 1 ml/min for ovalbumin and lysozyme. FIG. 18 demonstrates that over the range of pH 2–10, the retention volume of lysozyme and ovalbumin remained constant, indicating that the coating was stable in this pH range.

Preparation of a Weak Cation Exchanger

The coated PS-DVB beads were added to 30 ml of 0.1% (v/v) acrylic acid solution (Aldrich), and, after degassing and sonication, one gram of ammonium persulfate was added to initiate crosslinking and derivatization. The reaction was carried out for 23 hours at room temperature, then 20 µl of TEMED was added. The reaction was continued for another hour. The reaction was quenched by the addition of 10 mg of hydroquinone. The particles were washed with water, methanol, and acetone, then filtered and dried.

Preparation of a Strong Cation Exchanger

The poly(glycidyl methacrylate) coated PS-DVB packing material (1 g) of 1000 Å pore size, and 10 µm particle size was dispersed in 30 ml of water. After degassing and sonicating, 0.45 g 2-acrylamido-2-methyl-1-propane-sulfonic acid (Aldrich) was dissolved in the mixture. APS (0.9 g) was added, and the mixture was stirred mechanically under a nitrogen atmosphere for 23 hours. 20 µl tetramethylethylene diamine (TEMED) were added, and the reaction was continued for another hour. The packings were filtered and washed with water, methanol and acetone.

Preparation of a Strong Anion Exchanger

The poly(glycidylmethacrylate) coated PS-DVB of 1000 Å pore size and 10 µm particle size (1 g) was re-dispersed in 30 ml of water. After degassing and sonicating, 0.5 g [3-(methacryloylamino)propyl] trimethylammonium chloride (Aldrich) and ammonium persulfate (APS) (0.9 g) were blended into the mixture. The mixture was mechanically stirred under nitrogen for 23 hours, then TEMED (20 µl) was added, and the reaction was continued for another hour. The packing material was filtered and washed with water, methanol and acetone.

Preparation of a Weak Cation Exchanger

The poly(glycidyl methacrylate) coated packing material (1000 Å, 10 µm, 1 g) was re-dispersed in 30 ml of water. After degassing and sonicating, 0.45 g 2-acrylamidoglycolic acid (Aldrich) and APS were added and the mixture was stirred mechanically under nitrogen atmosphere for 23 hours. 20 µl of TEMED then were added, and the reaction was continued for another hour. The packings were filtered and washed with water, methanol and acetone.

Preparation of a Weak Cation Exchanger

One gram of the poly(glycidyl methacrylate) coated PS-DVB packing material (POROS R/H, 10 µm) was re-dispersed in 30 ml of water. After degassing and sonicating, itaconic acid (0.03 g) and APS (0.9 g) were added, and the mixture was stirred mechanically under a nitrogen atmosphere for 23 hours. TEMED (20 µl) was then added and the reaction continued for another hour. The packings were filtered and washed with water, methanol and acetone.

Preparation of HIC Packing Material

The poly (glycidyl methacrylate) coated PS-DVB polymer (1.5 g) was re-dispersed in 40 ml of water. After degassing and sonicating, freshly distilled ethyl vinyl ketone (0.08 ml) and 0.5 ml of THF were added to the mixture. The reaction was initiated with APS and the mixture was stirred mechanically for 23 hours under a nitrogen atmosphere. TEMED (30 µl) was added, and the reaction was continued for another hour. The packings were filtered and washed with water, methanol and acetone.

The invention may be embodied in other specific forms without departing from the spirit and scope thereof. Other embodiments are within the following claims.

What is claimed is:

1. A method of producing a hydrophilic coating covalently linked to a hydrophobic surface of a polymer, the method comprising the steps of:

a) providing a high surface area polymer having a hydrophobic surface comprising unsaturated groups;

b) providing a first compound, free of poly(glycidyl methacrylate), comprising a hydrophobic domain covalently and flexibly bonded to a hydrophilic domain, the hydrophobic domain comprising an unsaturated group;

c) contacting the hydrophobic surface with a liquid phase, hydrophilic with respect to the surface, containing solvated molecules of the first compound, thereby to deposit molecules of the compound on the hydrophobic surface oriented with the hydrophobic domains proximate to and adsorbed on the surface and with the hydrophilic domains extending outwardly from the surface into the liquid phase; and d) covalently crosslinking the unsaturated group on the hydrophobic domain of molecules of the first compound to the unsaturated groups on the hydrophobic surface to produce a hydrophilic coating covalently bound to the surface of the polymer, wherein the hydrophilic domains present in the coating substantially shield the hydrophobic surface of the polymer.

2. The method of claim 1 wherein the compound provided in step b) comprises plural hydrophilic domains and plural hydrophobic domains.

3. The method of claim 1 wherein said crosslinking step (d) is a free radical reaction.

4. The method of claim 3 wherein the first compound is modified polyvinylalcohol.

5. The method of claim 3 further comprising:

e) derivatizing the first compound after step d) to produce a hydrophilic moiety.

6. The method of claim 5 wherein the hydrophilic moiety is selected from the group consisting of hydroxyl, aidehyde, carboxylic acid, sulfonic acid and quaternary amine.

7. The method of claim 5 wherein the hydrophilic coated polymer obtained in step e) defines a chromatography matrix.

8. The method of claim 5 wherein the hydrophilic coating covalently bound to the hydrophobic surface is stable from pH 2 to pH 12.

9. The method of claim 5 wherein the covalent coating comprises a fimbriate structure with sufficient hydrophilic groups to mask the hydrophobic domains and the hydrophobic surface.

10. The method of claim 1 wherein the polymer comprises divinylbenzene crosslinked polystyrene.

11. The method of claim 1 wherein the unsaturated groups on the hydrophobic surface of the polymer titrate to at least about 0.23 mmol/g of polymer.

12. The method of claim 5 wherein the first compound further comprises a reactive group, and wherein step (e) comprises:

covalently reacting the reactive group on the first compound to a second compound comprising a hydrophilic moiety.

13. The method of claim 12 wherein the reactive group on the first compound comprises a hydroxyl, the second compound comprises glycidol; and wherein step (e) comprises polymerizing plural molecules of glycidol to the reactive group of the first compound, thereby to produce a covalent coating comprising plural hydroxyls.

14. The method of claim 13 further comprising, in step (e), oxidizing hydroxyls of the covalently bound coating, thereby to produce carboxylic acid groups.

15. The method of claim 12 wherein the reactive group on the first compound comprises a hydroxyl, and wherein the second compound comprises an epihalohydrin; and wherein step (e) comprises:

reacting the epihalohydrin with the reactive group of the first compound to produce a terminal halogen on the covalent coating; and reacting the terminal halogen on the covalent coating with an amine to produce a quaternary amine on the covalent coating.

16. A method of producing a hydrophilic coating covalently attached to a hydrophobic surface of a polymer, the method comprising the steps of:

a) providing a high surface area polymer having a hydrophobic surface comprising unsaturated groups;

b) providing a first compound, free of methacrylic acid, comprising a hydrophobic domain covalently and flexibly bonded to a hydrophilic domain, the hydrophobic domain comprising an unsaturated group;

c) contacting the hydrophobic surface with a liquid phase, hydrophilic with respect to the surface, containing solvated molecules of the first compound, thereby to deposit molecules of the compound on the hydrophobic surface oriented with the hydrophobic domains proximate to and adsorbed on the surface and with the hydrophilic domains extending outwardly from the surface into the liquid phase; and d) covalently crosslinking the unsaturated group on on the hydrophobic domain of molecules of the first compound to the unsaturated groups on the hydrophobic surface by a free radical reaction to produce a hydrophilic coating covalently bound to the surface of the polymer, wherein the hydrophilic domains present in the coating substantially shield the hydrophobic surface of the polymer.

17. The method of claim 16 further comprising:

(e) derivatizing the first compound to produce a hydrophilic moiety.

18. The method of claim 17 wherein the hydrophilic moiety is selected from the group consisting of carboxylic acid, sulfonic acid and quaternary amine.

19. The method of claim 17 wherein the first compound is poly(glycidyl methacrylate).

20. The method of claim 19 wherein step (e) includes the step of reacting the poly(glycidyl methacrylate) coating with a second compound selected from the group consisting of acrylic acid, 2-acrylamido-2-methyl-1-propanesulfonic acid, [3-(methacryloyl-amino)propyl] trimethylammonium chloride, 2-acrylamidoglycolic acid, itaconic acid and ethyl vinyl ketone.

21. The method of claim 20 wherein steps d) and e) are conducted simultaneously.

22. A hydrophilic material useful in contact with a protein solution to inhibit denaturation thereof, said material comprising a high surface area polymer having a hydrophobic surface, and a hydrophilic coating, covalently bound to said hydrophobic surface, said hydrophilic material being formed by the process of:

a) providing a high surface area polymer having a hydrophobic surface comprising unsaturated groups, and a compound, free of poly(glycidyl methacrylate), or free of methacrylic acid, comprising a hydrophobic domain covalently and flexibly bonded to a hydrophilic domain, the hydrophobic domain comprising an unsaturated group;

b) contacting the hydrophobic surface with a liquid phase, hydrophilic with respect to the surface, containing solvated molecules of the compound, thereby to deposit molecules of the compound on the hydrophobic surface oriented with the hydrophobic domains proximate to and adsorbed on the surface and with the hydrophilic domains extending outwardly from the surface into the liquid phase; and c) covalently crosslinking the unsaturated group on on the hydrophobic domain of molecules of the compound to the unsaturated groups on the hydrophobic surface by a free radical reaction to produce a hydrophilic coating covalently bound to the surface of the polymer.

23. The material of claim 22 wherein the compound is modified polyvinylalcohol free of poly(glycidyl methacrylate)

24. The material of claim 22 wherein the compound is poly(glycidyl methacrylate) free of methacrylic acid.

25. The material of claim 22 wherein said polymer comprises polystyrene crosslinked with divinylbenzene.

26. The material of claim 22 wherein step (c) further comprises derivatizing the compound to produce a hydrophilic moiety.

27. The material of claim 26 wherein said hydrophilic coating comprises sufficient hydrophilic groups to to mask said hydrophobic domains and said hydrophobic surface.

28. The material of claim 26 wherein said hydrophilic moiety is selected from the group consisting of hydroxyl, aidehyde, carboxylic acid, quaternary amine and sulfonic acid.

29. A hydrophilic material useful in contact with a protein solution to inhibit denaturation thereof, said material comprising:

a hydrophobic surface enveloped by a hydrophilic coating, covalently bound to said surface, said coating comprising a fimbriate structure comprising a multiplicity of elongate polymer chains extending from said surface and comprising plural hydrophilic groups, said chains being present at a surface density sufficient effectively to mask said hydrophobic surface and substantially to eliminate hydrophobic interaction between a said protein solution and areas of said hydrophobic surface.

30. The material of claim 29 wherein said hydrophobic surface comprises particulate polystyrene crosslinked with divinyl benzene.

31. The material of claim 29 wherein said hydrophilic groups are selected from the group consisting of hydroxyl, carboxylic acid, quaternary amine, and sulfonic acid.

* * * * *